(12) United States Patent
Alisawi

(10) Patent No.: US 9,326,185 B2
(45) Date of Patent: *Apr. 26, 2016

(54) MOBILE NETWORK CONGESTION RECOGNITION FOR OPTIMIZATION OF MOBILE TRAFFIC

(71) Applicant: Seven Networks, Inc., San Carlos (CA)

(72) Inventor: Rami Alisawi, Kerava (FI)

(73) Assignee: Seven Networks, LLC, Marshall, TX (US)

( * ) Notice: Subject to any disclaimer, the term of this patent is extended or adjusted under 35 U.S.C. 154(b) by 363 days.

This patent is subject to a terminal disclaimer.

(21) Appl. No.: 13/956,174

(22) Filed: Jul. 31, 2013

(65) Prior Publication Data

US 2014/0254359 A1    Sep. 11, 2014

Related U.S. Application Data

(63) Continuation of application No. 13/956,133, filed on Jul. 31, 2013, now Pat. No. 8,750,123.

(60) Provisional application No. 61/776,573, filed on Mar. 11, 2013, provisional application No. 61/818,801, filed on May 2, 2013, provisional application No. 61/829,965, filed on May 31, 2013, provisional application No. 61/776,584, filed on Mar. 11, 2013.

(51) Int. Cl.
*H04W 28/02* (2009.01)
*H04W 52/02* (2009.01)

(52) U.S. Cl.
CPC ...... *H04W 28/0284* (2013.01); *H04W 52/0219* (2013.01); *H04W 52/0245* (2013.01); *H04W 52/0254* (2013.01)

(58) Field of Classification Search
CPC .............. H04W 28/0242; H04W 28/0289; H04L 47/14
See application file for complete search history.

(56) References Cited

U.S. PATENT DOCUMENTS 8,750,123 B1 * 6/2014 Alisawi ............ H04W 28/0284
370/231
2003/0039267 A1  2/2003 Koo et al.
(Continued)

FOREIGN PATENT DOCUMENTS

KR    20000048229 A    7/2000
KR  1020000048229 A    7/2000
(Continued)

OTHER PUBLICATIONS

Final Office Action mailed Feb. 11, 2015 for U.S Appl. No. 14/147,434.
(Continued)

*Primary Examiner* — Siming Liu
(74) *Attorney, Agent, or Firm* — NK Patent Law, PLLC

(57) ABSTRACT

Systems and methods for mobile network congestion recognition for optimization of mobile traffic are disclosed. A mobile device having a local proxy equipped with congestion recognition capabilities can sample time consumed to establish data connection between the mobile device and the mobile network, collect data including at least one of signal strength data, cell identifier, and location area code associated with the data connection between the mobile device and the mobile network, and anticipate network congestion, based at least on the time consumed and the collected data. On detecting mobile network congestion, the local proxy can apply a blocking policy to block all or low priority traffic from signaling the congested mobile network to ease the congestion.

70 Claims, 20 Drawing Sheets

(56) References Cited

U.S. PATENT DOCUMENTS

| | | |
|---|---|---|
| 2004/0128346 A1 | 7/2004 | Melamed et al. |
| 2009/0097454 A1 | 4/2009 | Yeou et al. |
| 2011/0194539 A1 | 8/2011 | Blasinski et al. |
| 2012/0221697 A1 | 8/2012 | Sainio et al. |
| 2013/0163431 A1 | 6/2013 | Backholm et al. |

FOREIGN PATENT DOCUMENTS

| | | |
|---|---|---|
| KR | 20030025621 A | 3/2003 |
| KR | 1020030025621 A | 4/2003 |
| KR | 20050092962 A | 9/2005 |
| KR | 1020050092962 A | 9/2005 |
| WO | 2012128792 A1 | 9/2012 |

OTHER PUBLICATIONS

Final Office Action mailed Mar. 13, 2015 for U.S. Appl. No. 13/912,067.

Non-final rejection mailed Jul. 29, 2015 for U.S. Appl. No. 14/147,468.

Non-final rejection mailed Jul. 15, 2015 for U.S. Appl. No. 14/147,434.

IPRP for International Application PCT/US2014/023441 mailed Jul. 28, 2014.

Form PCT/IB326 mailed Sep. 24, 2015 for PCT Application No. PCT/US2014/023441.

Form PCT/IB373 (Written Opinion) issued Sep. 15, 2015 for PCT Application No. PCT/US2014/023441.

USPTO, Final Rejection for U.S. Appl. No. 14/147,468, Dec. 15, 2015.

USPTO, Final Rejection for U.S. Appl. No. 14/147,434, Nov. 30, 2015.

USPTO, Non-Final Rejection for U.S. Appl. No. 14/468,032, Feb. 4, 2016.

USPTO, Non-Final Rejection for U.S. Appl. No. 14/467,951, Jan. 26, 2016.

* cited by examiner

Setup Time Stack 802

| | Setup Time (s) |
|---|---|
| $t_1$ | 2.5 |
| $t_2$ | 2.7 |
| $t_3$ | 2.8 |
| $t_4$ | 2.4 |
| $t_5$ | 2.5 |
| $t_6$ | 2.6 |
| ... | ... |
| $t_n$ | 2.2 |

Temporary Setup Time Stack 804

| | Setup Time (s) |
|---|---|
| $t_1$ | 3.2 |
| $t_2$ | 3.5 |
| $t_3$ | 4.1 |
| $t_4$ | 3.5 |
| $t_5$ | 4.5 |
| $t_6$ | 2.8 |
| ... | ... |
| $t_n$ | 4.1 |

Potential Congestion Cases 806

| | Location Area Code (LAC) | Cell ID | Setup Time (s) | Signal Strength |
|---|---|---|---|---|
| $t_1$ | Location Area 1 | Cell ID 1 | 3.2 | poor |
| $t_2$ | Location Area 1 | Cell ID 2 | 3.5 | poor |
| $t_3$ | Location Area 1 | Cell ID 2 | 4.1 | good |
| $t_4$ | Location Area 1 | Cell ID 2 | 3.5 | good |
| $t_5$ | Location Area 1 | Cell ID 2 | 4.5 | good |
| $t_6$ | Location Area 1 | Cell ID 1 | 2.8 | good |
| ... | ... | ... | ... | ... |
| $t_n$ | Location Area 1 | Cell ID 1 | 4.1 | good |

808

Confirmed Congestion Cases 810

| | Location Area Code (LAC) | Cell ID | Setup Time (s) | Signal Strength |
|---|---|---|---|---|
| $t_3$ | Location Area 1 | Cell ID 2 | 4.1 | good |
| $t_4$ | Location Area 1 | Cell ID 2 | 3.5 | good |
| $t_5$ | Location Area 1 | Cell ID 2 | 4.5 | good |
| $t_6$ | Location Area 1 | Cell ID 1 | 2.8 | good |
| ... | ... | ... | ... | ... |
| $t_n$ | Location Area 1 | Cell ID 1 | 4.1 | good |

*FIG. 8*

MOBILE NETWORK CONGESTION RECOGNITION FOR OPTIMIZATION OF MOBILE TRAFFIC

CROSS-REFERENCE TO RELATED APPLICATIONS

The present application is a continuation of U.S. patent application Ser. No. 13/956,133 entitled "MOBILE DEVICE EQUIPPED WITH MOBILE NETWORK CONGESTION RECOGNITION TO MAKE INTELLIGENT DECISIONS REGARDING CONNECTING TO AN OPERATOR NETWORK," filed Jul. 31, 2013, which claims priority to and benefit from: U.S. Provisional Patent Application No. 61/776,573 titled "MOBILE DEVICE EQUIPPED WITH MOBILE NETWORK CONGESTION RECOGNITION TO MAKE INTELLIGENT DECISIONS REGARDING CONNECTING TO AN OPERATOR NETWORK", filed on Mar. 11, 2013; U.S. Provisional Patent Application No. 61/818,801 titled "MOBILE DEVICE EQUIPPED WITH MOBILE NETWORK CONGESTION RECOGNITION TO MAKE INTELLIGENT DECISIONS REGARDING CONNECTING TO AN OPERATOR NETWORK", filed on May 2, 2013; U.S. Provisional Patent Application No. 61/829,965, entitled "MOBILE DEVICE EQUIPPED WITH MOBILE NETWORK CONGESTION RECOGNITION TO MAKE INTELLIGENT DECISIONS REGARDING CONNECTING TO AN OPERATOR NETWORK," filed on May 31, 2013; and U.S. Provisional Patent Application No. 61/776,584 entitled "SYSTEMS AND METHODS OF FACILITATING AN OPERATOR TO PROACTIVELY IDENTIFY WEAKNESS AREAS AND POOR PACKET ACCESS IN A WIRELESS NETWORK," filed Mar. 11, 2013. The aforementioned applications are hereby incorporated by reference in entirety.

BACKGROUND

Applications on smartphones, tablets and other always on devices constantly signal the mobile network for updates and other data requests. The constant polling from mobile devices puts a burden on the mobile network, causing mobile network congestion. Solutions that involve upgrading operator hardware to Long Term Evolution (LTE) and other technologies has only limited effect on reducing mobile network congestion because of the exponential increase in data traffic from mobile devices.

BRIEF DESCRIPTION OF THE DRAWINGS

FIG. 8 illustrates examples of data sampled and analyzed by the congestion detector or recognizer in detecting and verifying congestion in the mobile network.

DETAILED DESCRIPTION

Figures 1, 1A:
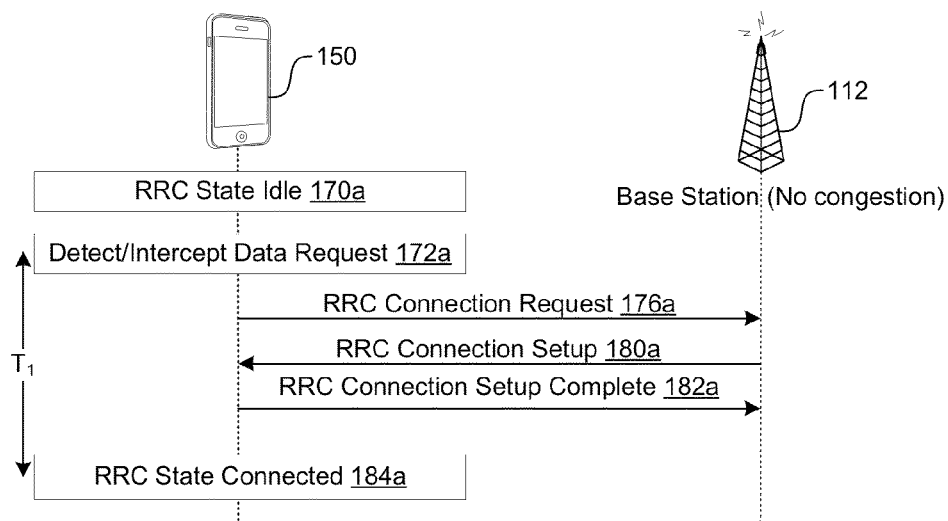
FIGS. 1A-1, 1A-2 and 1A-3 depict example signaling for data connection establishment between a mobile device and a base station under different traffic conditions.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

In many instances, mobile network operators are not prepared to handle a signaling storm. As a result, the mobile network operators blindly block user devices (e.g., mobile device) from accessing the network. However, the user device keeps querying the network for access, which requires signaling processing from the already overloaded network. The disclosed technology provides a solution that equips a user device with congestion recognition, which, in case of mobile network congestion, informs a client or local proxy to prevent or block most of the traffic leaving from the user device, and allows only critically important ones to reach the network. Using the disclosed technology, the user device is prevented from querying the congestion network for access, which can worsen the congestion situation.

The disclosed technology provides several advantages. A user device equipped with congestion recognition can detect network congestion independent of other devices. Furthermore, the user device requires no communication with any other network components to avoid adding extra signaling load. The user device having congestion recognition capability is smart enough to anticipate the congestion, without requiring any network infrastructure support and without relying on a specific mobile device chipset or baseband, among others.

Embodiments of the present disclosure include systems and methods of mobile network congestion recognition by a mobile device in a mobile network. Embodiments of the present disclosure further include systems and methods of generating and reporting mobile network congestion reports by a mobile device in a mobile network to a server. Embodiments of the present disclosure also include systems and methods of aggregating mobile network congestion information from mobile devices, and providing the network congestion information to mobile network operators.

In one embodiment, a mobile device equipped with congestion recognition can make a decision about a congestion happening in the operator network. A single mobile device is able to detect the congestion independently from any other mobile devices and without any form of communication with a server side component. The ability to make the determination regarding congestion in the network, independently, is an important feature because under congestion conditions, communication with the device is not guaranteed and any form of communication causes additional load on the already congested network. Each congestion recognition instance on a mobile device decides on its own by studying measurements collected naturally by a local proxy on the mobile device. Once a congestion is recognized in the given operator network by the congestion recognition component, the local proxy in the proxy system (e.g., the distributed proxy system shown in FIGS. 1A-1E) applies a blocking policy to minimize the traffic outgoing from the mobile device to ease the congestion.

In one embodiment, congestion can be recognized, determined and/or estimated using one or more indicators of congestion in a network known to or likely known to at the mobile device (e.g., by the local proxy). For example, one of these indicators can include an amount of time it takes the mobile device to turn on a radio after a request to turn on a radio is received. This request to turn on the radio can be from a request to place a call, a request made by an application, a user's request to access email, or the like. This delay can range from a few hundred milliseconds, 1.5 seconds, up to a few more seconds. Depending on the delay after which the radio turns on, and/or in combination with one or more other indicators known to the mobile device, the mobile device can make a decision with respect to the given mobile network regarding whether to attempt to connect to the mobile network or to wait to connect to the mobile network for a given amount of time, or to apply an intelligent algorithm based on a computed level of congestion to determine an optimal amount of time to wait before re-attempting to reconnect.

In a further embodiment, false positives in identifying or detecting congestion is reduced or eliminated based on other indications such as whether the mobile device is stationary or in motion, the number of base stations the mobile device connects to in a given amount of time, geographical locale, signal quality, network equipment characteristics, or the like.

FIGS. 1A-1, 1A-2 and 1A-3 depict example signaling for radio resource control (RRC) connection establishment between a mobile device and a base station under different traffic conditions.

The RRC protocol on the radio interface between a user device 150 and a radio access network (RAN) that includes a base station 112 is used for handling the control plane signaling. The RRC protocol allows for connection establishment and release and radio bearer establishment/reconfiguration and release, among others. The RRC exists in two modes, the idle mode and the connected mode. Referring to FIG. 1A-1, when the user device 150 is in the low or idle state 170a, the user device has no radio connection with the base station 112 in the radio access network, and is not involved in a voice call, data transfer, etc. In order to transition from the idle state 170a to connected (or high) state 184a, the mobile device 150 initiates an RRC connection request 176a towards the base station 112. The RRC connection request 176a can be initiated in response to a trigger from the mobile device (e.g., sending an email, making a call, or the like), or from the network (e.g., an incoming SMS message, a voice call, or the like). For example, the RRC connection request 176a can be in response to detecting or intercepting a data request 172a. Following a three-way handshake (176a, 180a and 182a, for example) between the user device 150 and the base station 112, the RRC state of the user equipment changes from idle to connected (e.g., DCH state). In an instance where the base station 112 is not congested, the setup time for establishing the connection between the mobile device 150 and the base station 112 is measured as the time difference $T_1$ between detecting or intercepting of the data request 172a and transition to connected state 184a from idle state.

Figures 1, 1A, 2:
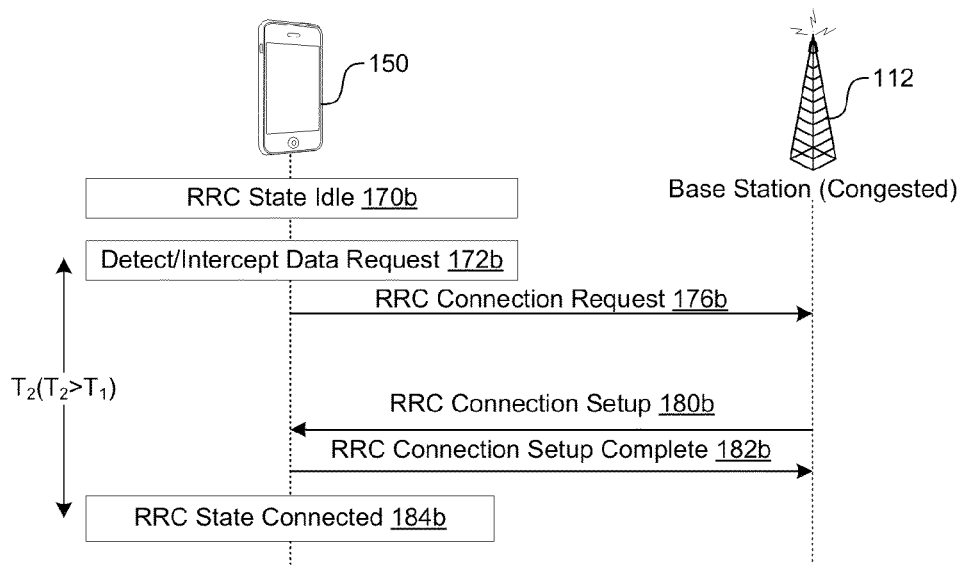
Figures 1, 1A, 2, 3:
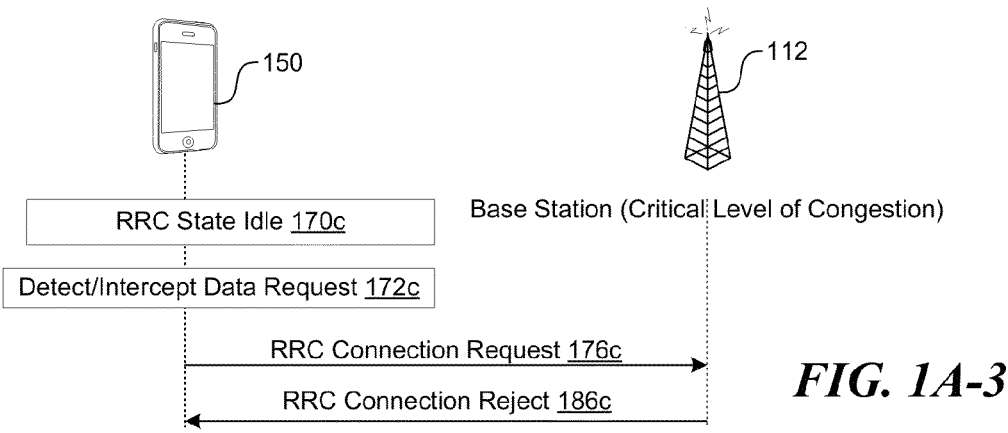

Referring to FIG. 1A-2, when the base station 112 is congested, the time to transition from idle RRC state 170b to connected RRC state 184b is longer than $T_1$. As a large number of mobile devices attempt to establish a connection with the base station 112, it takes longer for the base station 112 to complete the three-way handshake (176b, 180b and 182b, for example). This results in an increase in the setup time to $T_2$ from $T_1$. Referring to FIG. 1A-3, as before, on detecting or intercepting a data request 172c while the user device 150 is in idle state 170c, the user device 150 sends an RRC connection request 176c towards the base station 112. However, when the base station 112 reaches a critical level of congestion, the base station 112 (i.e., the operator) has its own mechanism to deal with the congestion by rejecting the connection requests 176c from the user device 150 attempting to establish a radio connection. However, the network operator's mechanism for sending an RRC connection reject message 186c is triggered only when the congestion reaches a critical level. Further, some operators may only indicate the cause of the rejection (i.e., congestion) in the rejection message, while others may indicate a wait time. The user device 150 then either continues to send connection requests to the network to check for access, or waits until the wait time is over, before sending connection requests to check for access. In either situation, signaling continues, and can further exacerbate congestion at the network.

User devices equipped with congestion recognition can recognize the increase in time to transition to a connected state when a radio connection request is received, and can implement a blocking policy on the traffic from the mobile device to the base station to reduce or prevent further signaling to the base station which can worsen congestion.

Figure 1B:
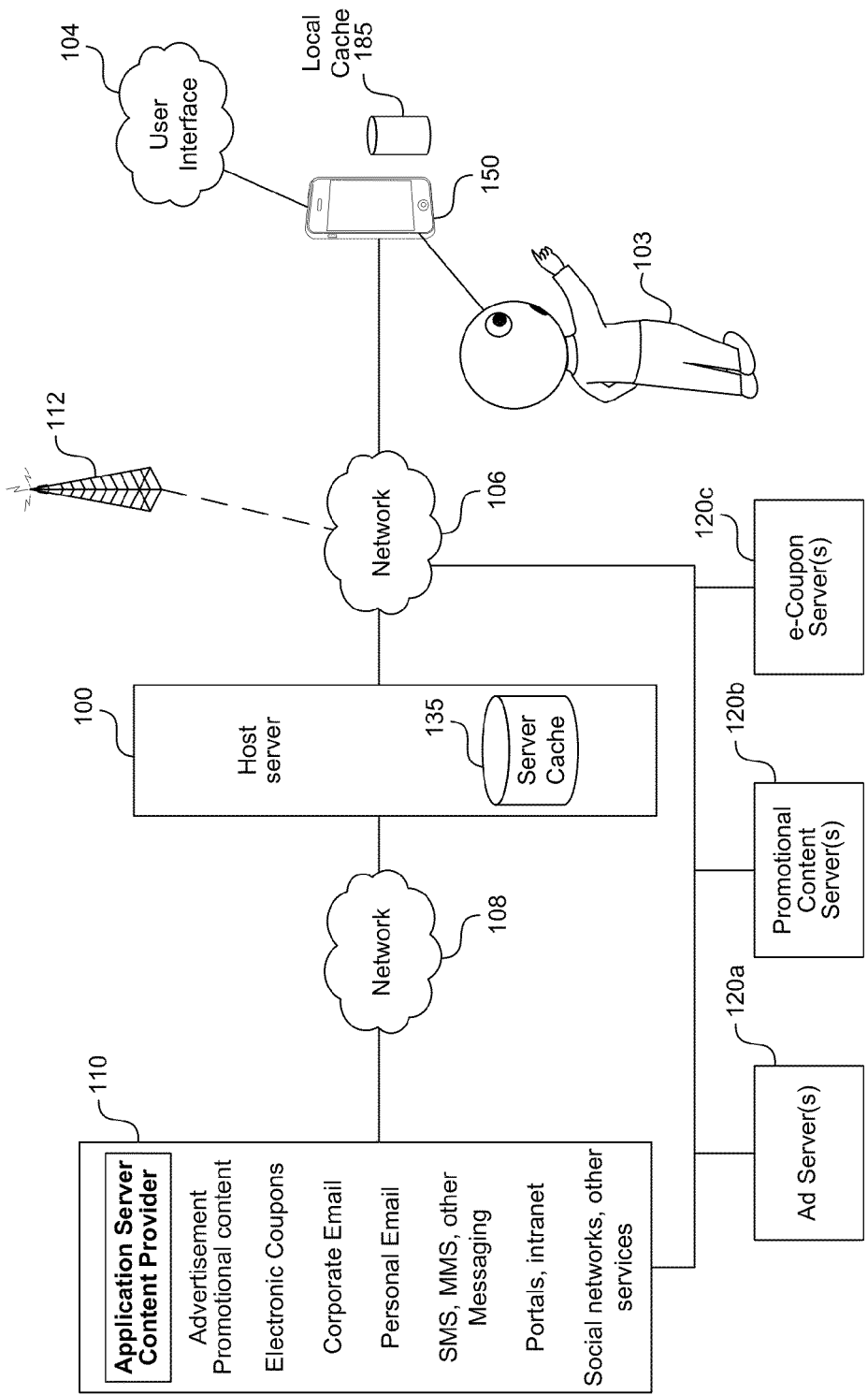
FIG. 1B illustrates an example diagram of a system where a host server facilitates management of traffic, content caching, and/or resource conservation between mobile devices (e.g., wireless devices), an application server or content provider, or other servers such as an ad server, promotional content server, or an e-Coupon server in a wireless network (or broadband network) for resource conservation. The host server can further aggregate mobile network congestion reports from multiple mobile devices, perform processing and/or analysis on data from the aggregated congestion reports, and provide a report to mobile network operators to help them understand their mobile network from the mobile device perspective.

FIG. 1B illustrates an example diagram of a system where a host server 100 facilitates management of traffic, content caching, and/or resource conservation between mobile devices 150 (e.g., wireless devices), an application server 110 or content provider, or other servers such as an ad server 120a, promotional content server 120b, or an e-Coupon server 120c in a wireless network (or broadband network) for resource conservation. The host server can further aggregate mobile network congestion reports from multiple mobile devices, perform processing and/or analysis on data from the aggregated congestion reports, and provide a report to mobile network operators to help them understand their mobile network from the mobile device perspective.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smartphone, a PDA, a Blackberry device, a Palm device, any tablet, a phablet (a class of smartphones with larger screen sizes between a typical smartphone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any superphone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/ behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side. In one embodiment, the traffic management for reducing signaling in the network and reducing or alleviating network congestion can be implemented on the mobile device 150 without any support from the server-side proxy or other network-side components.

In yet another embodiment, the traffic management can be triggered upon detection of congestion at the base stations 112 to which the client devices 150 is connected to or is attempting to connect to. The traffic management includes selection and/or application of a blocking policy to, for example, selectively or completely block traffic from the client devices so that signaling towards the base station 112 is reduced or eliminated. For example, a blocking policy that allows only high priority traffic towards the base station can be implemented when congestion is detected at the base station. By way of another example, a blocking policy that allows traffic from certain applications towards the base station can be implemented to manage congestion at the base station.

Functions and techniques disclosed for context aware traffic management for resource conservation in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Functions and techniques performed by the proxy and cache components in the client device 150 and the related components therein are described, respectively, in detail with further reference to the examples of FIG. 2A.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
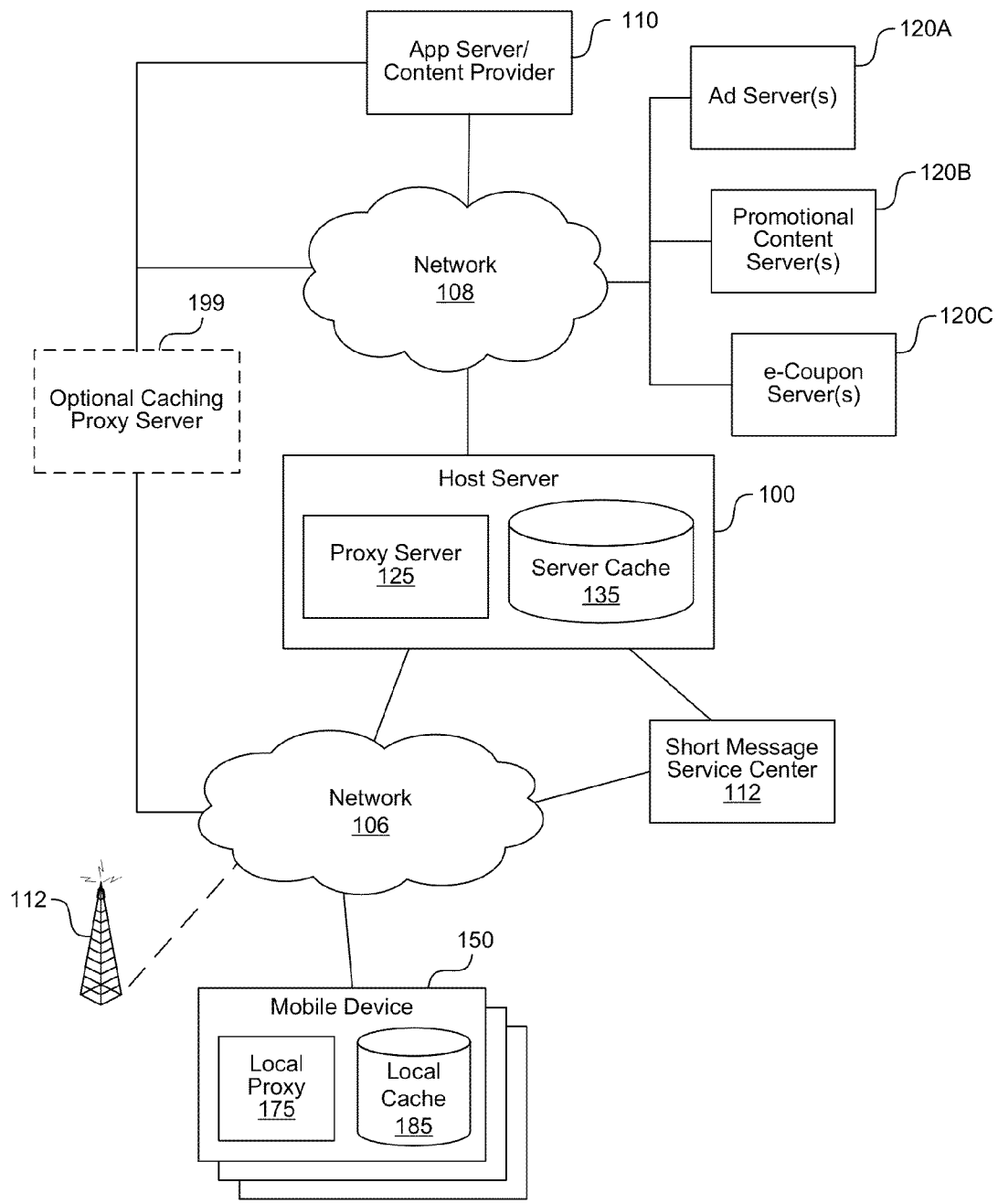
FIG. 1C illustrates an example diagram of a proxy and cache system distributed between the host server and a mobile device which facilitates network traffic management between the mobile device, an application server or content provider, or other servers such as an ad server, promotional content server, or an e-Coupon server for resource conservation and content caching. The proxy system distributed among the host server and the mobile device can further detect, generate, and aggregate mobile network congestion reports from multiple mobile devices, process and/or analyze the aggregated congestion reports and provide, on a near real time basis, a report on distribution and occurrence of congestion to mobile network operators.

FIG. 1C illustrates an example diagram of a proxy and cache system distributed between the host server and a mobile device which facilitates network traffic management between the mobile device, an application server or content provider, or other servers such as an ad server, promotional content server, or an e-Coupon server for resource conservation and content caching. The proxy system distributed among the host server and the mobile device can further detect, generate and aggregate mobile network congestion reports from multiple mobile devices, process and/or analyze the aggregated congestion reports and provide, on a near real time basis, a report on distribution and occurrence of congestion to mobile network operators.

The distributed proxy and cache system can include, for example, the proxy server 125 (e.g., remote proxy) and the server cache 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

The distributed system can also include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or congestion alleviation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150. The local proxy 175 can further detect congestion at the network, implement traffic management strategies to ease the congestion at the network, and regularly report on detection of congestion to the proxy server 125 or the host server 100.

In addition, the local proxy 175 can identify and retrieve mobile device properties, including one or more of, battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2A.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices. The proxy server 125 can further aggregate reports on detection of congestion from multiple mobile devices to provide reports on congestion distribution and timing patterns and other information to operators of the networks.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that SMSC 112 can also utilize any other type of alternative channel including USSD or other network control mechanisms. The host server 100 can forward content or HTTP responses to the SMSC 112 such that it is automatically forwarded to the device 150 if available and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications. Further, by recognizing signs or indications of congestion at the network earlier, the local proxy 175 can proactively manage signaling from the mobile device towards the network to mitigate or ease congestion at the network, and prevent the congestion at the network from reaching a critical level whereby the network operator is forced to blindly reject mobile devices attempting to connect to the network.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority traffic) towards the network, the local proxy 175 can conserve battery resources of the mobile device.

Figure 1D:
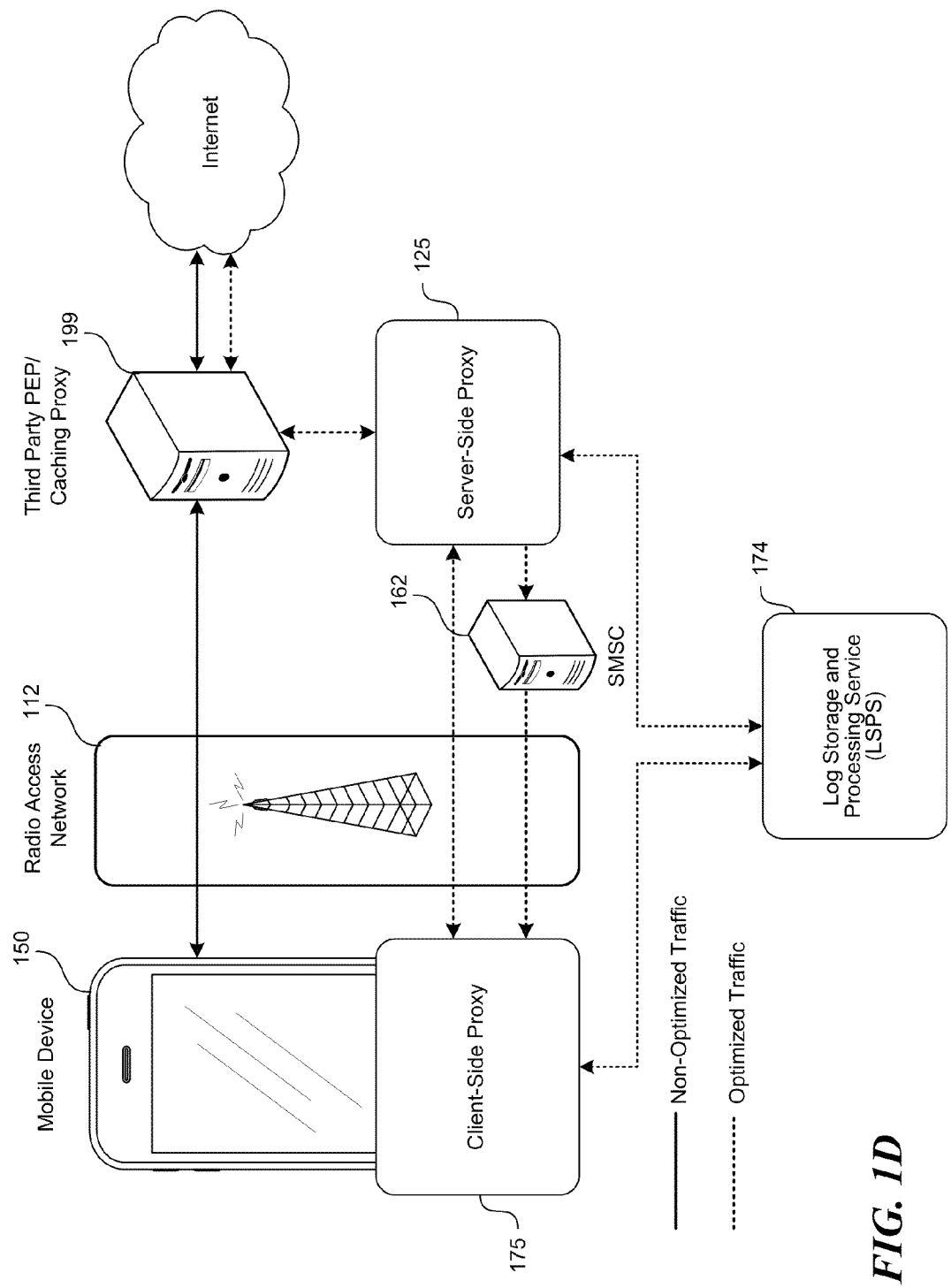
FIG. 1D illustrates an example diagram of the logical architecture of a distributed proxy and cache system, including a log storage and processing service.

FIG. 1D illustrates an example diagram of the logical architecture of a distributed proxy and cache system. The distributed system can include, for example the following components:

Client Side Proxy 175: a component installed in a smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIG. 2A.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers. Some components and features of the server-side proxy 125 are illustrated with further references to the examples of FIG. 1F and FIG. 2D.

Log Storage and Processing Service (LSPS) 174: The log storage and processing service, server, system or component 174 can provide reporting and usage analytics services. The LSPS 174 can collect information (e.g., logs) from the client side 175 and/or the server side 125 and provide the necessary tools for producing reports and usage analytics can be used for analyzing traffic and signaling data. The client logs (e.g., logs on the client device 150 aggregated by the local proxy 175) are stored in the device until a data channel is activated, and then are transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated, may be a server separate from the server-side proxy 125, or it may be a component of the server-side proxy 125, residing partially or wholly therein.

In one implementation, the level of logging (e.g., types of data to be logged, and the like) can be specified using configuration settings in the client-side proxy 175 and/or the server-side proxy 125. Various data relating to bytes and transactions, network connectivity, power, subscriber count, and the like may be logged, and/or processed using default (or another) settings on a periodic (e.g., hourly, daily, and the like) basis.

Bytes and Transactions data may include a number of bytes transacted (both to and from), total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175 the number of transitions into data connected mode saved by the client-side and/or server-side proxy system, the amount of time in data connected state saved by the client-side and/or server-side proxy system, simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

Figure 1E:
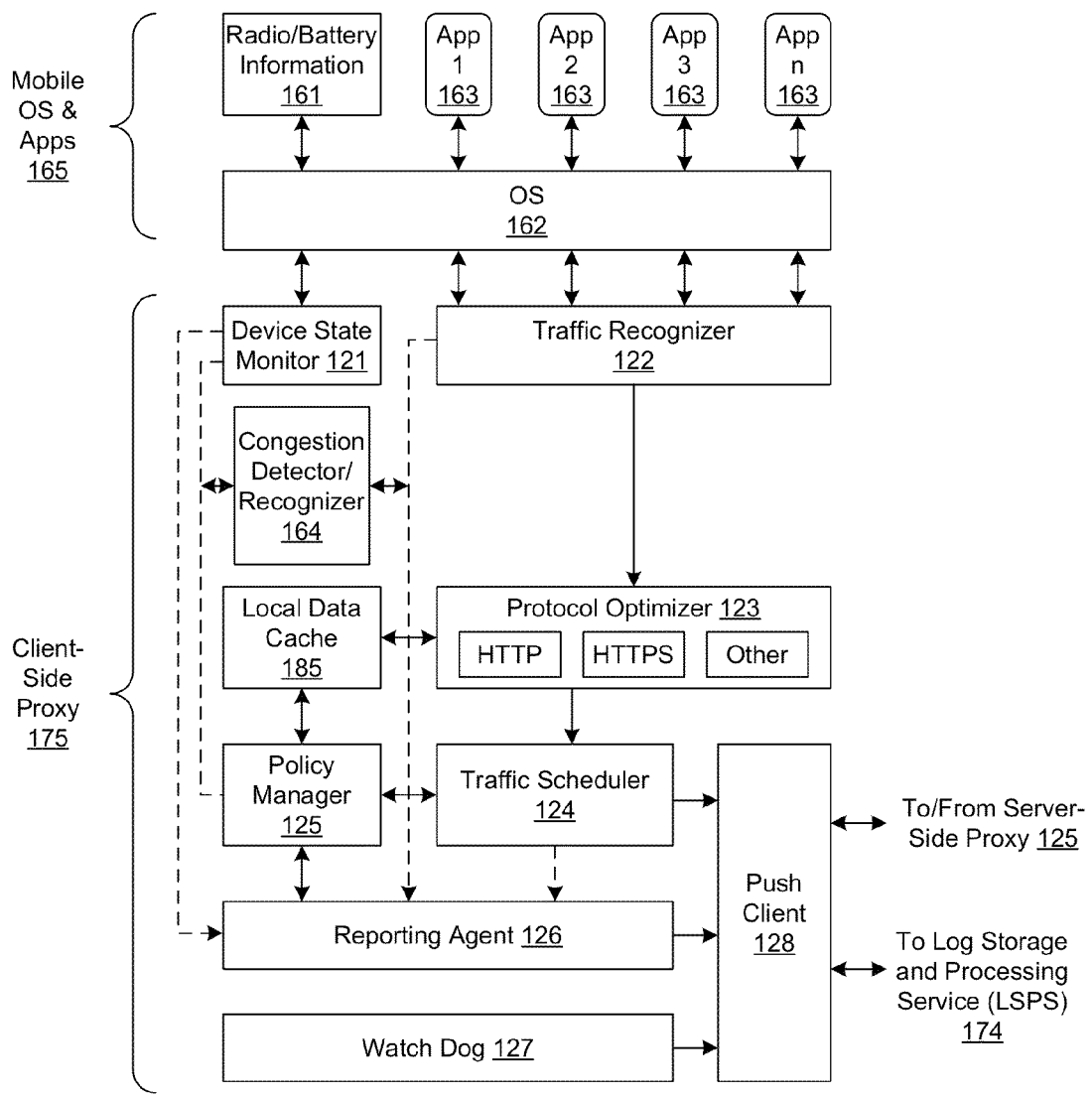
FIG. 1E illustrates an example diagram showing the architecture of client side components in a distributed proxy and cache system, including a congestion detector or recognizer.

FIG. 1E illustrates an example diagram showing the architecture of client-side components in a distributed proxy and cache system, including a congestion detector or recognizer.

The client side proxy components 175 can include software components or agents installed on the mobile device that enables traffic optimization and performs the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One of its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS) 143. At the client side proxy 175 first start, traffic optimization and reporting policies (policy profiles) that is to be enforced in a particular device can be provisioned by the Policy Management Server. Enforcing traffic management policies at the device's IP later lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 125.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and sends the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a log storage and processing service 174, which may be internal to or external to the server side proxy 125.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1F:
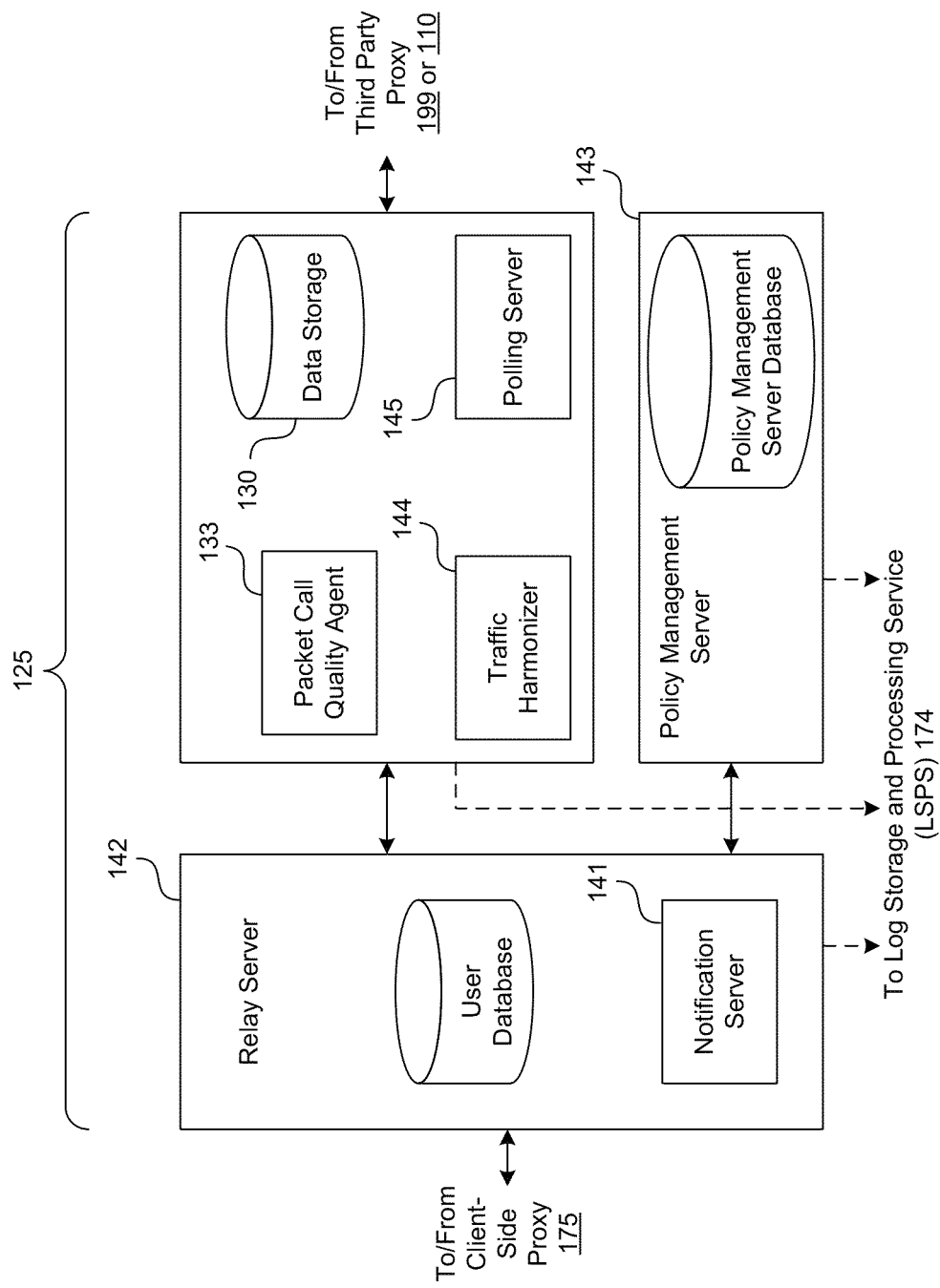
FIG. 1F illustrates a diagram of the example components on the server side of the distributed proxy and cache system, including a packet call quality agent.

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports (e.g., congestion reports), provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized. If a change occurs (i.e. new data available) for an application, the polling server 145 can report to the traffic harmonizer 144 which in turn sends a notification message to the client-side proxy 175 for it to clear the cache and allow application to poll application server directly.

Figure 2A:
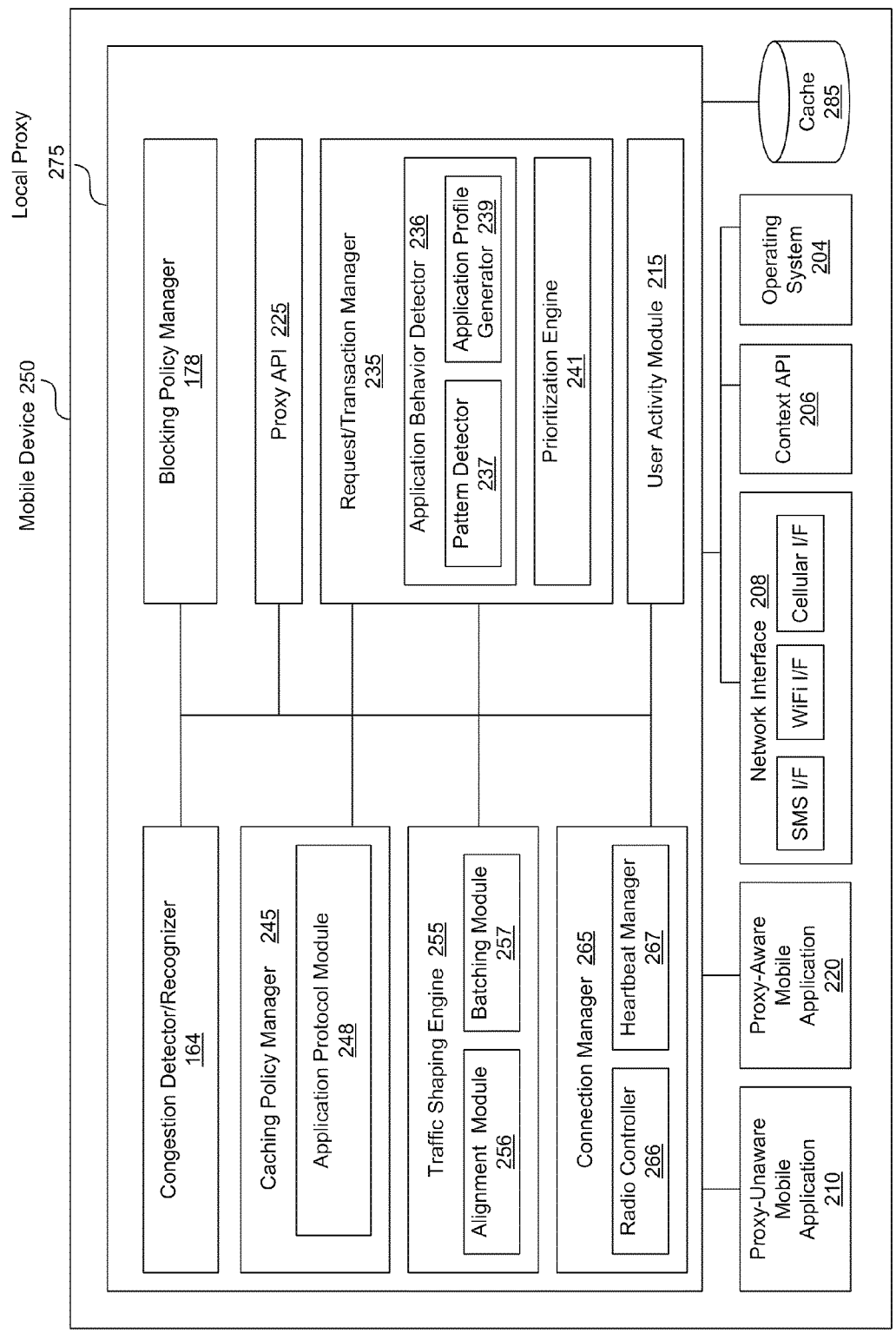
FIG. 2A illustrates a block diagram depicting an example of client-side components in a distributed proxy and cache system, further including a congestion detector or recognizer.

Packet Call Quality Agent 133: The Packet call quality agent 133 can proactively identify weakness areas and poor packet access in a wireless network. Packet call quality agent 133 can utilize the reports generated by the congestion recognizer 164 on the mobile device (e.g., via a local proxy) as illustrated in FIG. 2A to facilitate an operator to proactively identify weakness areas and poor packet access in a wireless network, then translate and map them into operator's cell identifiers and location area codes. This can allow operator to plan their network maintenance and upgrades according to near real time feedback from real subscriber devices. This can then make troubleshooting issues for an operator faster and cheaper.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Log Storage and Processing Service 174: The log storage and processing service 174 collects information (e.g., logs) from the client side 175 and/or from the server side 125, and provides the tools for analyzing and producing reports and usage analytics that operators can use for analyzing application signaling, data consumption, congestion, and the like.

FIG. 2A illustrates a block diagram depicting an example of client-side components in a distributed proxy and cache system, further including a congestion detector or recognizer 164.

A device 250, which can be a portable or mobile device (e.g., any wireless device), such as a portable phone, generally includes, for example, a network interface 208, an operating system 204, a context API 206, and mobile applications which may be proxy-unaware 210 or proxy-aware 220. Note that the device 250 is specifically illustrated in the example of FIG. 2A as a mobile device, such is not a limitation and that device 250 may be any wireless, broadband, portable/mobile or non-portable device able to receive, transmit signals to satisfy data requests over a network including wired or wireless networks (e.g., WiFi, cellular, Bluetooth, LAN, WAN, and the like).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, and the like), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266 and a heartbeat manager 267. The request/transaction manager 235 can further include an application behavior detector 236 and/or a prioritization engine 241, the application behavior detector 236 may further include a pattern detector 237 and/or and application profile generator 239. Device 250 can also include a congestion detector/recognizer 164 and a blocking policy enforcer 178. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voicemail, visual voicemail, feeds, Internet, games, productivity tools, or other applications, etc.

The proxy 275 is generally application independent and can be used by applications (e.g., both proxy-unaware and proxy-aware mobile applications 210 and 220 and other mobile applications) to open TCP connections to a remote server (e.g., the server 100 in the examples of FIGS. 1B-1C and/or server proxy 125 shown in the examples of FIG. 1B. In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, and the like. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIGS. 1B-1C) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 in the examples of FIGS. 1B-1C) send the data that was buffered as a result of the previously decreased communication frequency.

In addition, or in alternative, the local proxy 275 can communicate the characteristics of user activity at the device 250 to the remote device (e.g., host server 100 in the examples of FIGS. 1B-1C) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
| --- | --- | --- | --- |
| Send email | High | Receive email | High |
| Delete email | Low | Edit email | Often not possible to sync (Low if possible) |
| (Un)read email | Low | | |
| Move message | Low | | |
| Read more | High | | |
| Download attachment | High | New email in deleted items | Low |
| | | Delete an email | Low |
| New Calendar event | High | (Un)Read an email | Low |
| Edit/change Calendar event | High | Move messages | Low |
| | | Any calendar change | High |
| Add a contact | High | Any contact change | High |
| Edit a contact | High | Wipe/lock device | High |
| Search contacts | High | Settings change | High |
| Change a setting | High | Any folder change | High |
| Manual send/receive | High | Connector restart | High (if no changes nothing is sent) |
| IM status change | Medium | | |
| Auction outbid or change notification | High | | |
| | | Social Network Status Updates | Medium |
| Weather Updates | Low | Severe Weather Alerts | High |
| | | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1B or a content provider/application server such as the server/provider 110 shown in the examples of FIGS. 1B-1C). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 125 of FIGS. 1C-1D, 1F) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 125 of FIG. 1C) which forwards the data request to a content source (e.g., application server/content provider 110 of FIG. 1C) and a response from the content source can be provided through the remote proxy, as will be further described in the description associated with the example host server 100 of FIG. 1C. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 125 in the example of FIG. 1C).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-unaware and/or aware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead, by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1B).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
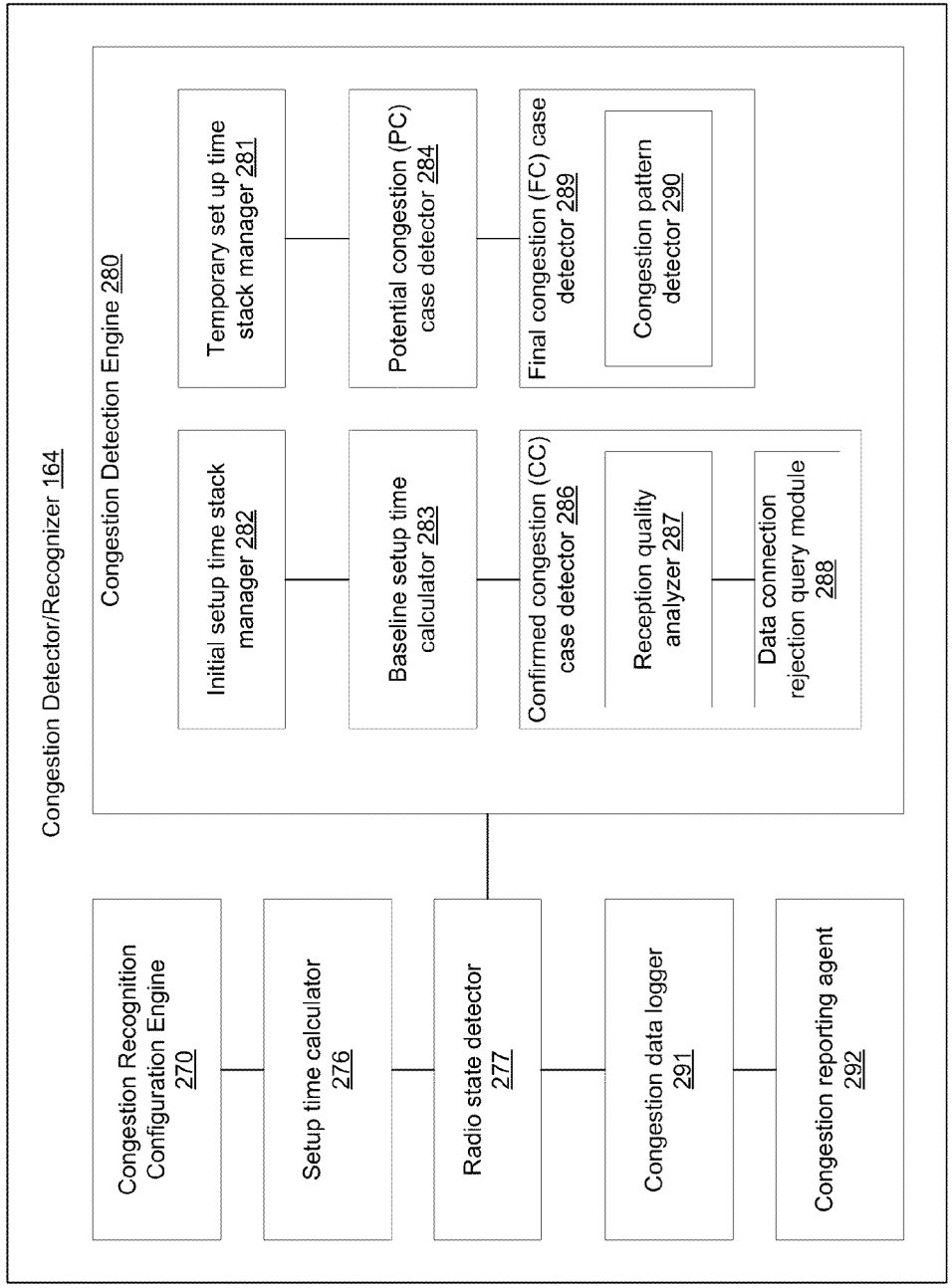
FIG. 2B illustrates a block diagram illustrating additional components in the congestion detector or recognizer shown in the example of FIG. 2A.

FIG. 2B illustrates a block diagram illustrating additional components in the congestion detector or recognizer shown in the example of FIG. 2A.

The congestion recognizer 164 can detect congestion in the network based on increase in setup times experienced by the mobile device in attempting to connect to a network, and further confirm that the increase in setup times is due to congestion, and for no other reasons (e.g., operator or network equipment specific). In one embodiment, the congestion recognizer 164 includes a congestion recognition configuration engine 270, a setup time calculator 276, a radio state detector 277, a congestion data logger 290, a congestion reporting agent 292 and a congestion detection engine 280 having an initial setup time stack manager 282, a temporary setup time stack manager 281, a baseline setup time calculator 283, a potential congestion case detector 284, a confirmed congestion case detector 286 having a reception quality analyzer 287 and a data connection rejection query module 288 and a final congestion case detector 289 having a congestion pattern detector 290. More or less components may be included in the congestion recognizer 164 in some other embodiments.

As used herein, a "module," "a manager," a "handler," a "detector," an "interface," a "controller," a "normalizer," a "generator," an "invalidator," a "calculator," a "logger," an "analyzer," an "agent," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, calculator, logger, analyzer, agent or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The congestion recognition configuration engine 270 configures the congestion recognizer 164 based on various settings and/or parameters. The settings and/or parameters may impact how aggressively congestion is recognized, the criteria for detecting and verifying that congestion is present, and the like. These parameters can be used in detecting potential congestion state from a sample of setup times, promoting potential congestion state to confirmed congestion state and triggering congestion decision from confirmed congestion state. In one implementation, one or more of the settings and/or parameters can be configured as a function of time. For example, during peak traffic times, the congestion recognition can be configured to be more aggressive.

In one implementation, the congestion recognition configuration engine 270 can be used to configure a number of setup time samples (st_stack) to be collected, a setup time standard deviation allowance (st_std), aggressiveness/sensitivity in triggering congestion decision from confirmed congestion state (num_ccc), and threshold for triggering congestion decision (pcd_trg). When st_stack is defined, a memory for storing the configured number of setup time samples is then allocated. A large sample or stack size adapts to change in setup time more slowly than a smaller sample or stack size. The setup time standard deviation allowance (st_std) can be used to adjust how aggressively a potential congestion state is detected. For example, if the st_std is zero, the logic is very sensitive to potential congestion. In one implementation, the congestion recognition configuration engine 270 can also configure the signal strength range for determining whether to convert a potential congested state to a confirmed congested state. For example, when the received signal code power (RSCP) that denotes the power measured by the mobile device on a communication channel, and provides an indication of signal strength, is between −105 and −115 dB, the signal strength is determined to be low, and a potential congestion state is not converted to confirmed congestion state, as the increase in setup times may be caused by poor signal strength, poor coverage or poor condition of radio link, and most likely not due to congestion.

The request/transaction manager 235 (of FIG. 2A) can detect, identify, intercept, process, manage, data requests initiated on the device 250. In one implementation, the request/transaction manager 235 can detect, identify or filter those requests requiring radio connection that are made when the radio state is idle. The setup time calculator 276 can measure the setup time for establishing a connection with a base station in the radio access network. The setup time is determined or measured as the time elapsed between detecting of a data request that requires a radio connection (or a radio turn on request) and transition of the radio state to a connected state from idle state in some implementations (i.e., RRC high timestamp—request time stamp during RRC low or idle). The radio state information can be determined or obtained from the radio state detector 277, for example. In other implementations, the setup time may be measured based on a radio access bearer setup time, measured as a time difference between transition to high RRC state timestamp and request timestamp. During a radio bearer reconfiguration procedure, a radio bearer reconfiguration message is sent by the network to a mobile device, and the mobile device acknowledges receipt of the message by sending a radio bearer reconfiguration complete message to the network.

The initial setup time stack manager 282 of the congestion detection engine 280 can aggregate a predetermined number of setup time samples (e.g., 20 samples or another number of samples based on st_stack), until the stack is full. When the stack is full, the initial setup time stack manager 282 can activate the logic for detecting potential congestion.

The baseline setup time calculator 283 can be triggered by initial setup time stack manager 282 to calculate a baseline or reference setup time from the sample of setup times collected by the initial setup time stack manager 282. In one implementation, the baseline is calculated as the sum of the average or mean of the setup times in the initial stack, the standard deviation of the setup times in the initial stack and the setup time standard deviation allowance (st_std). The baseline can be determined using a variation of the method above, or any other statistical method in other implementations. The baseline setup time calculator 283 can be triggered to update its calculation of baseline every time a new setup time value is measured by the setup time calculator module 276.

The potential congestion (PC) case detector 284 can be triggered by the activation of the congestion detection logic when the initial setup time stack is full. The potential congestion case detector 284 detects a potential case of congestion by detecting an increase in setup time values compared to the baseline. The setup time values that are longer than the baseline are stored in a temporary stack of the same size as the initial stack by the temporary setup time stack manager 281. The setup time values below the baseline replace the oldest values in the initial stack (via the initial setup time stack manager 282). In one implementation, the potential congestion case detector 284 can acquire cell-ID or other base station identifier information and/or location area code for each potential congestion case detected. In one implementation, the cell-ID and/or location area code may be obtained using Attention (AT) commands used for controlling a device modem. For example, AT+CREG command returns cell-ID and location area code.

The confirmed congestion case detector 286 can analyze the potential congestion cases and determine whether the potential congestion cases should be promoted to confirmed congestion cases. In order to detect confirmed congestion cases from potential congestion cases, the modem of the mobile device may be queried for reception quality data via the reception quality analyzer 287, for example. In one implementation, using AT+CSQ command, received signal strength indicator (RSSI) value, which can be mapped to signal condition (e.g., marginal, OK, good, excellent or the like), can be determined. Other reception quality data that can be queried include, for example, received signal code power (RSCP) and ratio of received energy per chip (Ec/Io). In a further implementation, the modem may be queried for any RRC rejection messages from the base station by the data connection rejection query module 288, for example.

The final or positive congestion case detector 289 can evaluate the confirmed congestion cases using the attached location area codes, cell IDs and other parameters (e.g., num_ccc and pcd_trg) to determine and/or verify whether the network is congested. In one implementation, the congestion pattern detector 290 can examine the cell-IDs and location area codes attached to the confirmed congestion cases to determine whether the confirmed congestion cases are concentrated on a few specific cell-IDs or are distributed over many cell-IDs and/or over multiple location area codes. This pattern of cell-IDs and/or location area codes associated with confirmed congestion cases can provide an indication to the final congestion case detector 289 that the mobile device is in motion, and the confirmed congestion cases cannot be reliably used to determine the presence of network congestion. For example, if the analysis of the congestion pattern indicates that a large number of confirmed congestion cases are concentrated on a one or two cells, the final congestion case detector 289 can make a positive or final congestion decision, and trigger the blocking policy manager 178 (shown in FIG. 2A, FIG. 2C). By way of another example, if the pattern of the confirmed congestion cases indicates cases associated with multiple cells belonging to different location area codes, the final congestion case detector 289 can determine that the mobile device is in motion, and a final decision cannot be taken.

The congestion data logger 290 can log select or all data relating to congestion detection. For example, the congestion data logger 290 can log data request timestamps, radio turn on timestamps, setup times in association with corresponding cell-IDs and location area codes, reception quality measurements (e.g., RSCP, a/Io, RSSI, and the like), final congestion detection data (e.g., final congestion detection date, time, cell-IDs, location area code, network operator (e.g., Verizon, AT&T, etc.), and the like), configuration parameters and/or settings, device information, and the like.

The congestion reporting agent 292, in one implementation, can upload the logged congestion data to the server-side proxy, the host server, and/or the log storage and processing service. The congestion reporting agent 292 may be configured to generate and send congestion reports to the LSPS or other remote entities periodically, or whenever a connection is available. In one implementation, the congestion reporting agent 292 can crate congestion reports using one or more templates.

Figure 2C:
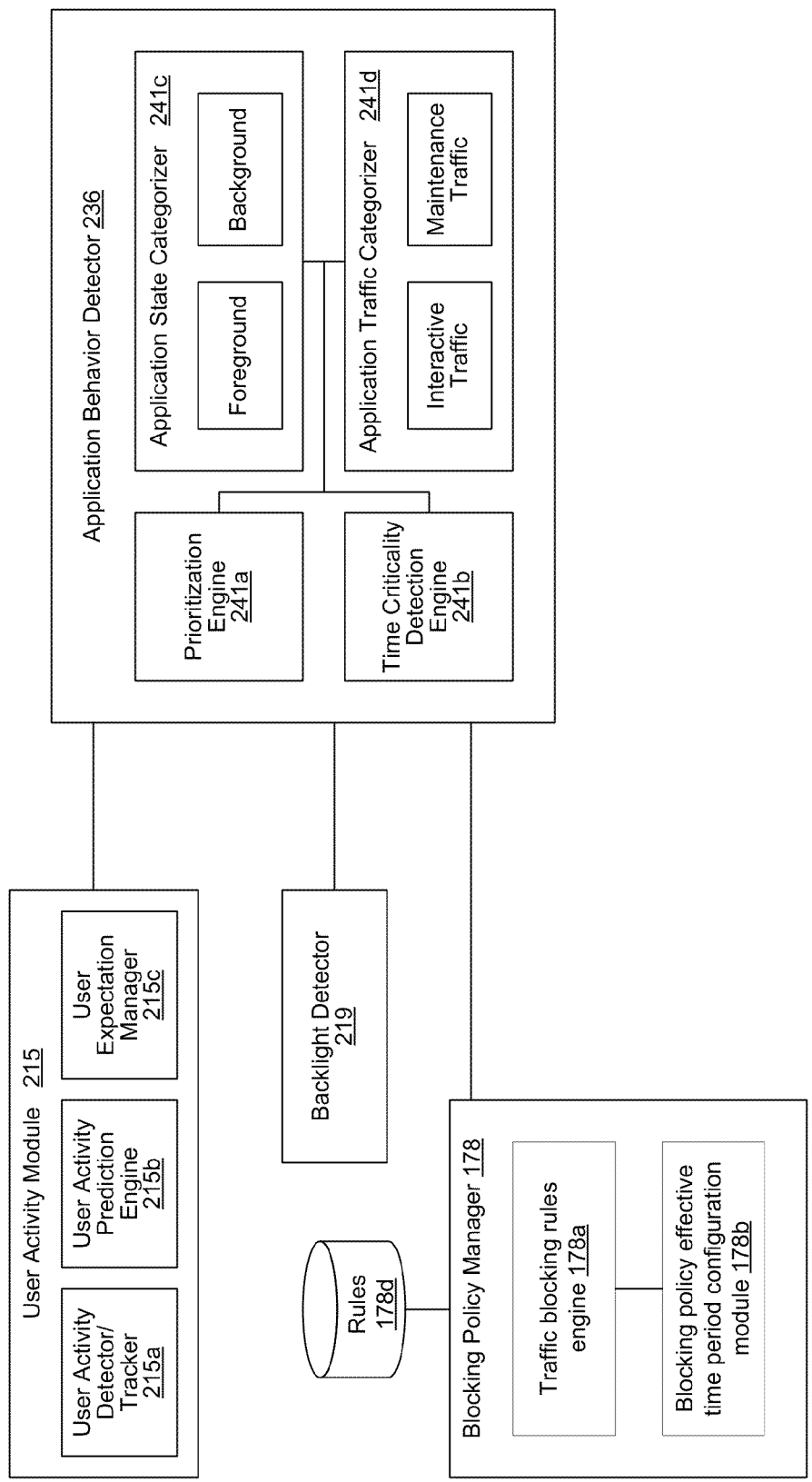
FIG. 2C illustrates a block diagram depicting additional components in the user activity module, the application behavior detector and the blocking policy manager shown in the example of FIG. 2A.

FIG. 2C illustrates a block diagram depicting additional components in the user activity module, the application behavior detector and the blocking policy manager shown in the example of FIG. 2A.

One embodiment of the local proxy 275 includes the user activity module 215, which further includes one or more of, a user activity detector/tracker 215a, a user activity prediction engine 215b, and/or a user expectation manager 215c. The application behavior detector 236 can further include a prioritization engine 241a, a time criticality detection engine 241b, an application state categorizer 241c, and/or an application traffic categorizer 241d. The local proxy 275 can further include a backlight detector 219. The blocking policy manager 178, in one embodiment, can include one or more of a traffic blocking rules engine 178a and a blocking policy effective time period configuration module 178b. One or more rules stored in the rules datastore 178d can be accessed by the blocking policy manager in implementing a blocking policy on traffic from the mobile device.

In one embodiment, the application behavior detector 236 may detect, determine, identify, or infer, the activity state of an application on the mobile device 250 from which traffic has originated or is directed to, for example, via the application state categorizer 241c and/or the application traffic categorizer 241d. The activity state can be determined based on whether the application is in a foreground or background state on the mobile device (via the application state categorizer 241c) since the traffic for a foreground application versus a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, and the like. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241a) and/or is not time-critical (e.g., by the time criticality detection engine 241b).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241a) and/or as being time critical/time sensitive (e.g., by the time criticality detection engine 241b).

The time criticality detection engine 241b can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as an add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these requests are likely to be responded to with the same data.

In the alternate or in combination, the activity state can be determined from assessing, determining, evaluating, infer-ring, identifying user activity at the mobile device 250 (e.g., via the user activity module 215). For example, user activity can be directly detected and tracked using the user activity tracker 215a. The traffic resulting therefrom can then be categorized appropriately for subsequent processing to determine the policy for handling. Furthermore, user activity can be predicted or anticipated by the user activity prediction engine 215b. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215c and/or in conjunction with the activity tracker 215a and/or the prediction engine 215b) to ensure that traffic is categorized appropriately such that user expectations are generally met. For example, a user-initiated action should be analyzed (e.g., by the expectation manager 215c) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by a network configuration selection engine) on the mobile device 250 in sending traffic between the mobile device and a proxy server and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

The blocking policy manager 178 allows traffic management policies such as traffic blocking policies to be enforced at the mobile device via the traffic blocking rules engine 178a and the blocking policy effective time period configuration module 178b. Enforcement of a blocking policy can be triggered by a specific event such as detection or recognition of congestion (e.g., via the final congestion case detector 289), or combination of events such as congestion detection and time of day, screen status, network interface (Wi-Fi or mobile, for example), and the like. Policies can be enforced over part of a defined time window. For example, the blocking policy manager can enforce a blocking policy for a period of time (e.g., 15 minutes) upon receiving or detecting an indication of congestion. When the blocking period of time is over, the blocking policy manager can drop the blocking policy.

In one embodiment, the blocking policy manager 178 can apply an intelligent algorithm based on a computed level of congestion to determine an optimal amount of time to wait before attempting to reconnect. For example, if the number of confirmed congestion cases per cell exceeds a threshold, then the level of congestion may be deemed high or above normal, and the blocking policy manager 178 can enforce the blocking policy for a longer duration than normal. By way of another example, if congestion is detected immediately after dropping the blocking policy, the blocking policy manager 178 can enforce another round of blocking policy for a duration longer than the previously enforced duration (e.g., 30 minutes instead of 15 minutes). In some instances, if certain conditions or criteria are met, a blocking policy can be enforced for a predefined or dynamically adjusted duration. For example, when congestion is detected during a certain time of day (e.g., between 5 PM and 7 PM), the blocking policy may be implemented for a longer period of time than normal (e.g., 30 minutes instead of 15 minutes). In one embodiment, the level of congestion can be quantitatively determined based on factors such as number of cells associated n number of congestion cases (confirmed, and/or potential), number of congestion cases per cell, timing, average setup times per cell, and the like and weights for the factors. Other methods for determining a quantitative measure of congestion may be used.

In some embodiments, the blocking policy manager 178 can block all traffic from the mobile device for the duration of the blocking policy enforcement. Alternately, the blocking policy manager 178 can implement a priority based traffic management, whereby certain high priority traffic can be allowed, while other low priority traffic would not be allowed to signal the network. The priority of the traffic may be determined via the application behavior detector 236, for example. These and other rules and conditions for implementing and/or configuring a blocking policy may be specified in the rules datastore 178d, in one implementation, and can be evaluated by the traffic blocking rules engine 178a.

Figure 2D:
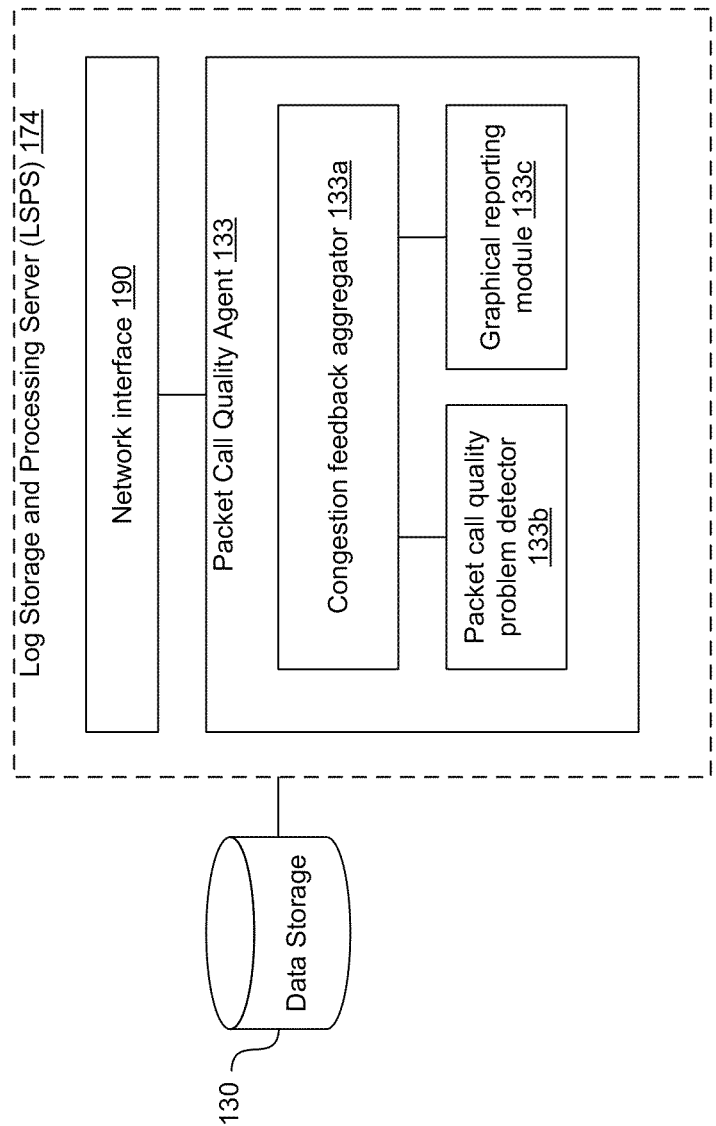
FIG. 2D illustrates a block diagram depicting components of a log storage and processing service shown in FIG. 1F.

FIG. 2D illustrates a block diagram depicting components of a log storage and processing service 174 shown in FIG. 1F. The log storage and processing service 174 can be component of the host server or proxy server, or can be a separate server that communicates with the client-side and server-side proxies. As previously described, the log storage and processing service 174 can aggregate, store and process data such as bytes and transactions data, network connectivity data, power data, subscriber count data, and the like. In one embodiment, the log storage and processing service 174 can include a network interface 190 and a packet call quality agent 133, among others.

The packet call quality agent 133 can aggregate and analyze congestion reports that include findings on congested cells or cell towers, including setup time, signal strength and/or other information from multiple mobile devices, and provide validated and near real time feedback about the network, saving the operator resources such as time and money. For example, if there is a congestion in a cell tower, the operator would be not be aware of the problem until a subscriber calls in to report the problem in his or her area, and the operator has a portable lab in the area to check for problems. However, with the packet call quality agent 133a, near real time information on call quality and congestion in various geographical locations can be provided to the operator to help the operator understand the network from a mobile device perspective and facilitate in shaping their strategy for preparing or upgrading hardware in a specific geographic location or area.

The packet call quality agent 133 can further include a congestion feedback aggregator 133a, a packet call quality problem detector 133b and/or a graphical reporting module 133c. The congestion feedback aggregator 133a can aggregate congestion reports from mobile devices equipped with congestion recognition, in one implementation. Alternately, the congestion feedback aggregator 133a can query an LSPS data store 130 for logs and/or congestion reports uploaded by mobile devices. The congestion feedback aggregator 133a can further aggregate congestion reports based on network operator (e.g., AT&T, Verizon, Sprint, and the like), network connection technology (2G, 2.5G, 3G, 4G LTE, and the like), time frame (e.g., congestion reports for April, congestion reports for congestion detected between 5 PM and 7 PM), by zip code or geographical area, and the like.

The packet call quality problem detector 133b can analyze the information in the congestion reports, and determine problem areas where call quality is poor, has poor or no coverage, and/or is congested on a regular basis. For example, in one implementation, the packet call quality problem detector 133b can be configured to identify a location as a problem area if the location has been reported as being congested by at least a certain number of mobile devices. Similarly, the packet call quality problem detector 133b can also determine and report a location as a chronic problem area if the location is reported as being congested by a certain number of mobile devices for n consecutive days/time period. Even when a location is not reported as being congested, the packet call quality problem detector 133b can examine the call quality data, setup times, and the like to determine potential problem areas. The graphical reporting module 133c can be used to generate a graphical report and/or display a map that depicts the problem areas (or areas in general) identified by the packet call quality problem detector 133b. In one implementation, the graphical reporting module 133c provides a user interface with which operators can interact to specify parameters (e.g., time, geographical area, and the like) and/or view a report or mapping of congestion patterns. The graphical reporting module 133c can depict congestion information as it is available (i.e., almost real time), or on an hourly, daily, weekly or other period basis.

Figure 9:
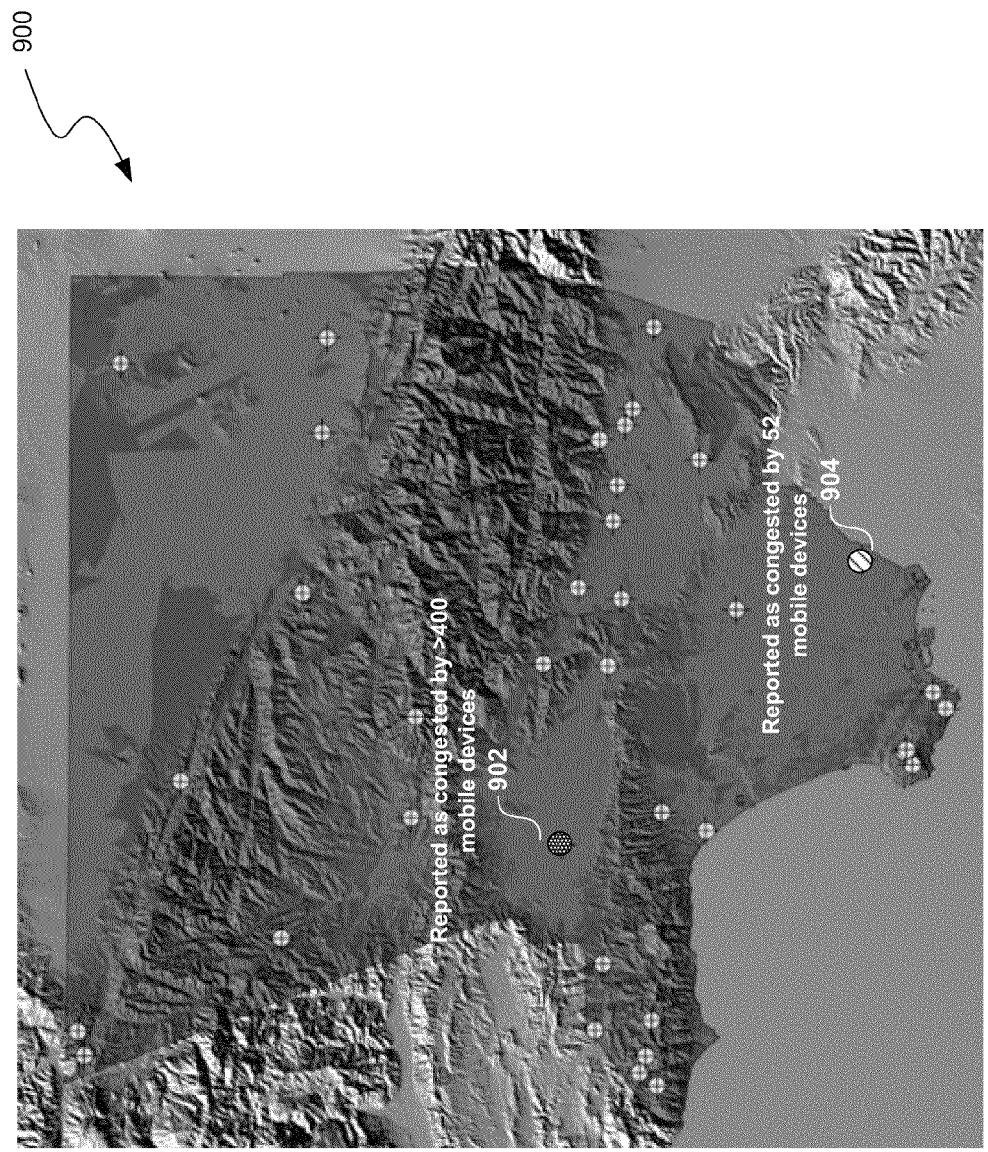
FIG. 9 illustrates an example map generated using data from congestion reports aggregated from multiple mobile devices.

FIG. 9 illustrates an example map 900 generated using data from congestion reports from mobile devices via the graphical reporting module 133c. The map 900 depicts markers corresponding to cell towers distributed throughout a geographical region. Data from congestion reports can be overlaid on top of the map 900 to identify or mark specific cell towers which have been reported as congested during a certain period of time. For example, marker 904 identifies a cell tower that has been identified as congested based on congestion reports from over 400 mobile devices. Similarly, marker 902 identifies a cell tower that has been identified as being congested based on congestion reports from 52 mobile devices. The information on congestion reports can be processed and displayed as they become available, so that a network operator can view this congestion report mapping in near real time, as the reports come in. The map 900, and/or other details may be accessed from a portal for network operators/service providers in one implementation. Alternately, aggregated congested data can be pushed or made available to subscribing network operators/service providers.

Figure 3A:
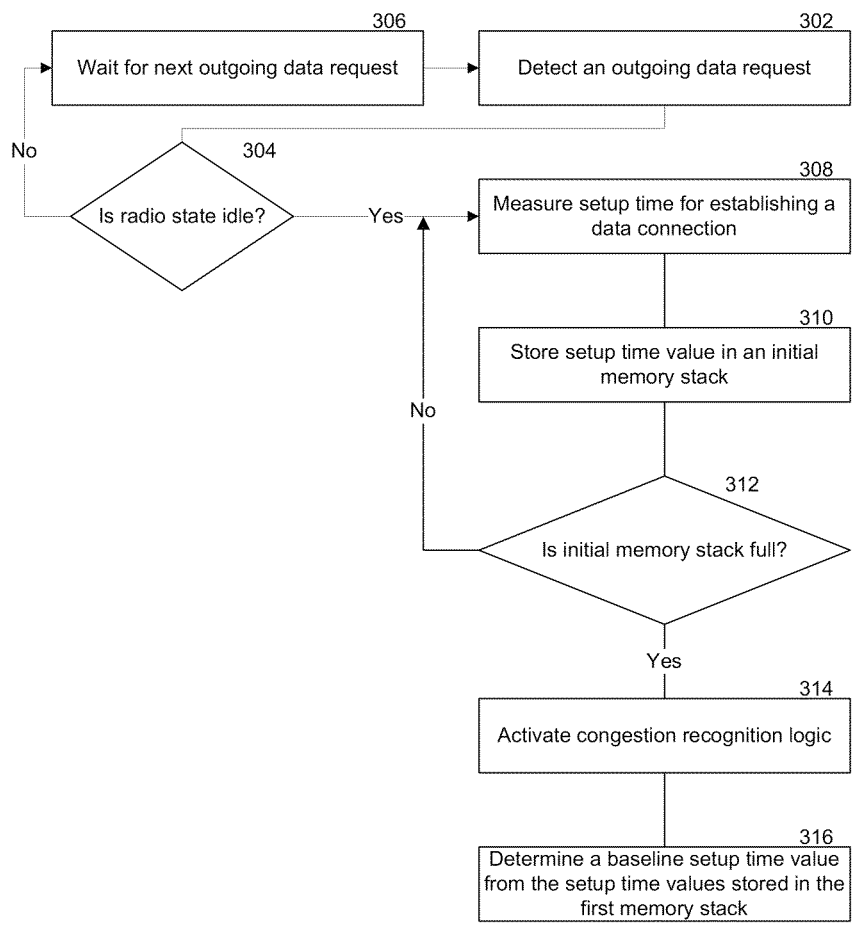
FIG. 3A illustrates a logic flow diagram of an example method for activating or triggering congestion recognition logic.

FIG. 3A illustrates a logic flow diagram of an example method for activating congestion recognition logic. The example method may be performed by one or more components of the congestion recognizer 164. At block 302, an outgoing data request from the mobile device is intercepted by the local proxy. At decision block 304, if the data request is made while the radio state of the mobile device idle, the congestion recognizer measures setup time for establishing a connection with the network at block 308. However, if the radio state is not idle (i.e., is connected), the data request is ignored at block 306 and the next data request is intercepted at block 302. The setup time is measured as the difference between when the radio state transitions to connected mode and when the data request was made (i.e., timestamp of radio state transition from idle to connected—timestamp of data request).

At block 310, the measured setup time is stored in a memory stack. The memory stack may be configured to store a preconfigured number of samples of setup time data (e.g., n samples). New setup times are measured and stored in the memory stack until the memory stack is determined to be full at decision block 312. When the memory stack is full, the congestion logic is activated or triggered at block 314. At block 316, a baseline setup time value is calculated from the setup time values in the stack. New setup time values are then compared with the baseline to detect an increase in setup time values which can indicate presence of congestion in the network.

The baseline is a statistical measure of the sample of setup time values stored in the memory stack. In one implementation, an average and a standard deviation of the setup time samples are calculated, and added to determine the baseline. In a further implementation, a setup time standard deviation allowance (st_std) can be added to the baseline to make the congestion detection logic more or less aggressive.

Figure 3B:
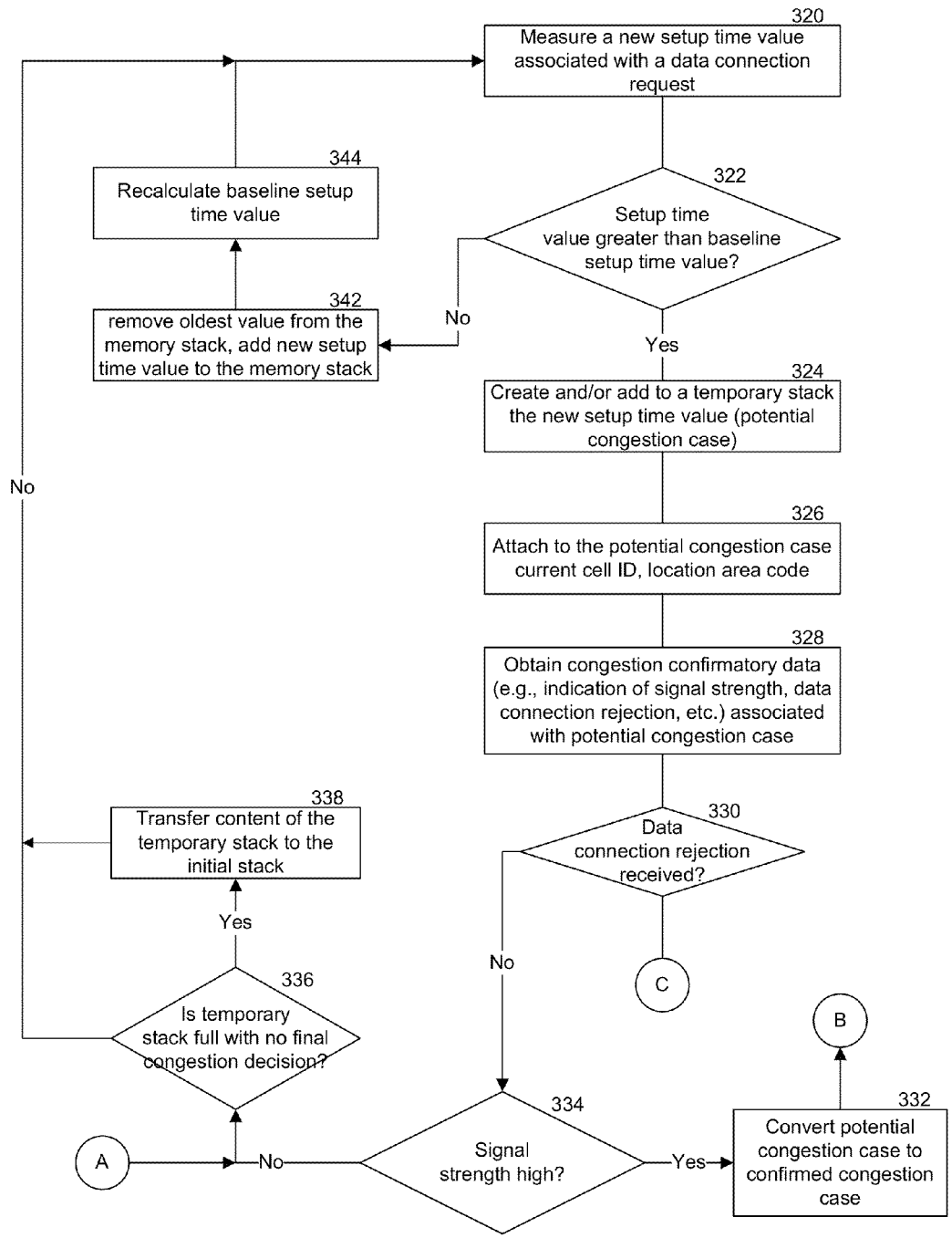
FIGS. 3B-3C illustrate logic flow diagrams of an example method for detecting and verifying congestion in the mobile network.
Figure 3C:
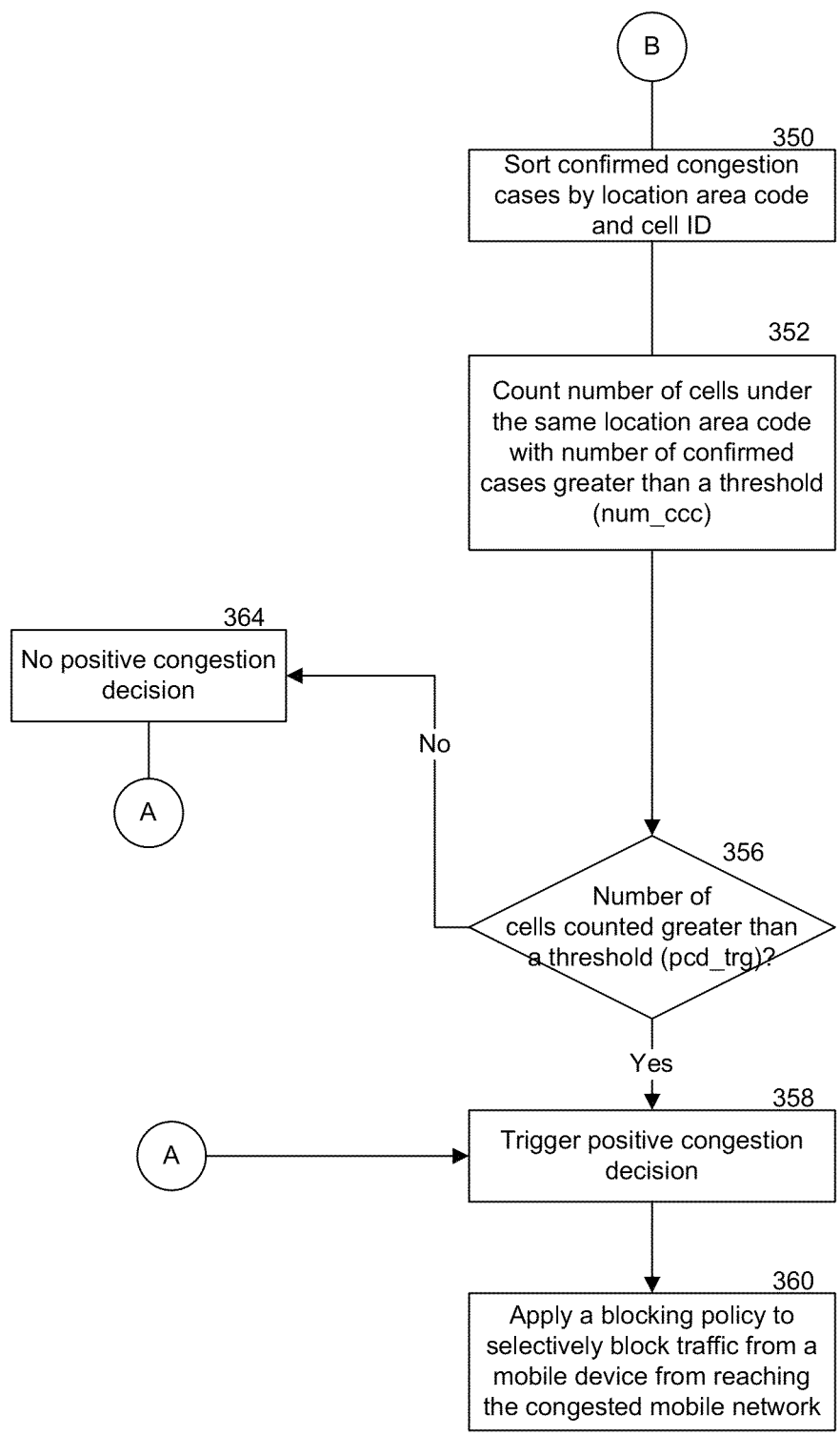

FIGS. 3B-3C illustrate logic flow diagrams of an example method for detecting and verifying congestion in the mobile network. At block 320, a setup time value (e.g., the n+1 sample) for the next data request is measured. The setup time value is compared with the baseline to determine whether the setup time value is higher than the baseline at decision block 322. If the setup time value is not higher than the baseline, the setup time value is stored in the original memory stack at block 342. To make room for the new value, the oldest value in the original memory stack is removed. At block 344, the baseline is updated to account for the new setup time value in the original memory stack.

However, if the setup time value is greater than the baseline as determined at decision block 322, the setup time value is added to a temporary memory stack at block 324. If a temporary memory stack does not exist, a new one having the same size as the original memory stack is created. The setup time samples in the temporary memory stack form the potential congestion cases (PCC). At block 326, the cell ID and/or location area code of the base station serving the mobile device when the setup time was calculated is retrieved. The cell ID and/or location area code are attached to the corresponding potential congestion case at block 326. At block 328, congestion confirmatory data including reception quality data (e.g., data providing indication of signal strength (e.g., RSCP, RSSI, Ec/Io, and the like)) are retrieved and associated with the corresponding potential congestion case.

In one implementation, the modem of the mobile device is queried to determine if an RRC rejection message has been received. At decision block 330, if the data connection rejection message is received from the network operator, a positive or final congestion decision is triggered at block 358 of FIG. 3C. However, if the data connection rejection has not been received at decision block 330, then the signal quality data is evaluated at decision block 334. The evaluation may include determining if the signal strength is high or low. For example, an RSCP value between −105 dB and −115 dB is considered low and is indicative of poor signal strength. Similarly, an RSCP value between −50 dB and −70 dB is considered high and is indicative of good signal strength. The evaluation of the signal quality data confirms whether the increase in setup times is due to congestion in the network, or due to poor coverage or poor condition of the radio link. When the signal strength associated with a potential congestion case is high, the potential congestion case is converted to a confirmed congestion case at block 332. Conversely, if the signal strength associated with a potential congestion case is low, the potential congestion case remains in the same state, and is not converted to a confirmed congestion case.

At decision block 336, if the temporary stack is full of potential congestion cases, but there has been no positive or final congestion decision, the content of the temporary stack is transferred to the original stack at block 338, such that the original stack now includes higher setup time values, and results in a higher baseline. This scenario may occur when the mobile device moves to an area that is associated with higher setup times, which may be due to network equipment or other reasons. For example, when a user is in his office in the city, the mobile device may record an average setup time of 2 seconds to establish a network connection. When the same user travels to his home in the suburb, the mobile device may record an average setup time of 3 seconds. Thus the congestion recognizer adapts to the increase or decrease of setup times that are characteristic of the network equipment and geographic location, and not necessarily congestion.

Referring to FIG. 3C, at block 350, the aggregated confirmed congestion cases are sorted under location area code and cell ID to further verify if the network is actually congested. At block 352, the number of cell IDs in the same location area code that have a number of congestion cases greater than a num_ccc parameter is counted. For example, assuming that the num_ccc parameter is 4 and cell ID 1 and 2 in the location area code 22, each have 5 and 6 confirmed congestion cases respectively, the number of cell IDs counted is equal to 2. If the number of cell IDs counted at block 352 is equal to or greater than a parameter such as the pcd_trg parameter, positive or final congestion decision is triggered at block 358. However, if the number of cell IDs counted is less than the pcd_trg, no positive congestion decision is triggered at block 364, and the congestion recognizer continues to sample new setup times. At block 360, a blocking policy to selectively block traffic from the mobile device from reaching the congested mobile network is applied. In one implementation, the blocking policy may be enforced for a predetermined duration of time, or until a user action or other priority request requiring network connection is detected.

Figure 4:
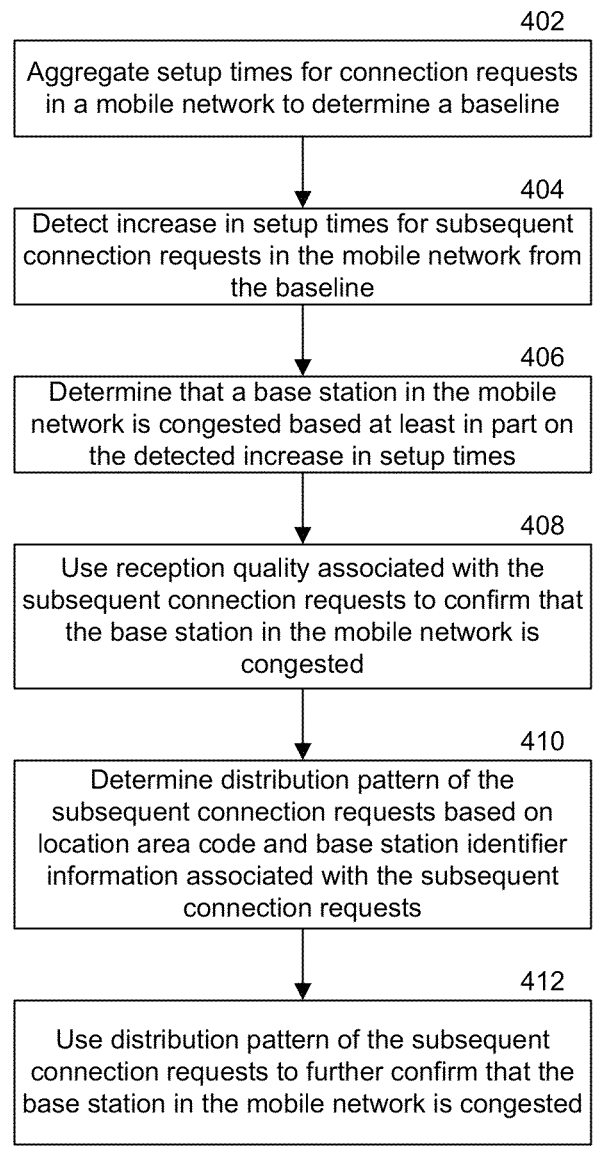
FIG. 4 illustrates a logic flow diagram of an example method for determining and confirming congestion in a mobile network using increase in setup times for establishing connection to the mobile network, reception quality of the connections, and distribution patterns of the connections.

FIG. 4 illustrates a logic flow diagram of an example method for determining and confirming congestion in a mobile network using increase in setup times for establishing connection to the mobile network, reception quality of the connections, and distribution patterns of the cells to which the mobile device connects to. The example method may be performed by one or more components of the local proxy 275 on the mobile device.

At block 402, the local proxy 275 having a congestion recognizer 164 aggregates setup times for connection requests in a mobile network to determine a baseline. In one implementation, the baseline is a statistical measure that adapts to network peculiarities. At block 404, the local proxy 275 detects increase in setup times for subsequent connection requests in the mobile network from the baseline, and at block 406 the local proxy 275 further determines that a base station in the mobile network is congested based at least in part on the detected increase in setup times. In one implementation, the local proxy 275 uses reception quality associated with the subsequent connection requests to confirm that the base station in the mobile network is congested at block 408. Further at block 410, the local proxy 275 determines a distribution pattern of the subsequent connection requests based on location area code and base station identifier information associated with the subsequent connection request. At block 412, the local proxy 275 uses distribution pattern of the subsequent connection requests to further confirm that the base station in the mobile network is congested.

In one implementation, the local proxy 275 applies or triggers application of a blocking policy (via the blocking policy manager 178) to selectively block traffic from the mobile device from reaching the mobile network in response to confirming that the mobile network is congested. In a further implementation, the blocking policy is applied for a predefined duration of time, or until a high priority data request is detected at the mobile device. In certain implementations, the local proxy 275 can further determine that the base station in the mobile network is congested when a rejection message is received in response to any one of the subsequent connection requests. The local proxy 275 can then apply or trigger the application of a blocking policy on traffic from the mobile device to reduce signaling to the mobile network.

Figure 5:
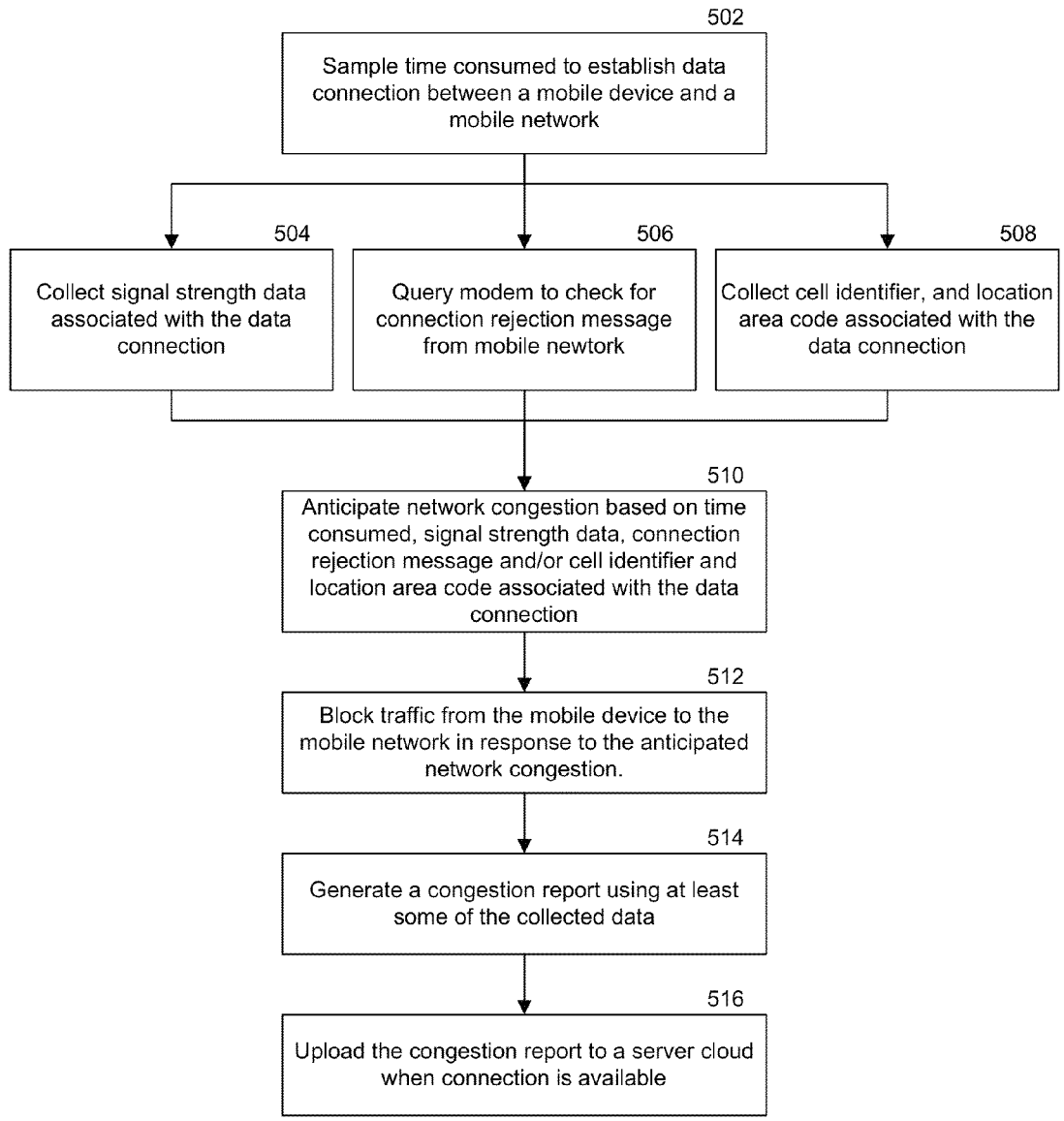
FIG. 5 illustrates a logic flow diagram of an example method for anticipating network congestion by a mobile device.

FIG. 5 illustrates a logic flow diagram of an example method for anticipating network congestion performed by a local proxy 275 on a mobile device equipped with a congestion recognizer 164. In this embodiment, the local proxy 275 can anticipate network congestion by sampling time consumed to establish data connection between a mobile device and a mobile network (block 502), collecting data including at least one of signal strength data, cell identifier, and location area code (504 and 508) associated with the data connection between the mobile device and the mobile network and anticipating, based at least on the time consumed and the collected data, network congestion at block 510. In a further implementation, the local proxy 275 can query the modem to check for connection rejection message from mobile network at block 506 in anticipating network congestion at block 510. At block 512, the local proxy 275 can block or trigger blocking of traffic from the mobile device to the mobile network in response to the anticipated network congestion at block 510. In one implementation, the local proxy 275 blocks low priority traffic from accessing the network. In a further implementation, the low priority traffic includes requests from background processes on the mobile device. Alternately, the local proxy 275 allows high priority traffic from the mobile device to signal the mobile network. High priority traffic includes a phone call, an SMS, an MMS, an email, or other user initiated request in one implementation. At block 514, the local proxy 275 can generate a congestion report using at least some of the collected data. Further at block 516, the congestion report can be uploaded to a server cloud (e.g., LSPS 174) periodically or when a connection is available. In one implementation, information in the congestion report and other congestion reports from multiple mobile devices associated with the mobile network is aggregated and provided to an operator of the mobile network (by the local proxy 275, the server-side proxy 125, or the LSPS 174, for example). The information in the congestion report can provide near real time information on network congestion and/or packet call quality information relating to the mobile network.

The local proxy 275 can anticipate network congestion on the mobile network regardless of the time consumed or the collected data when the data connection rejection message is received from the mobile network. In another implementation, the time consumed to establish the data connection is based on time difference between time of a data request and time of transition of the radio state to connected state from idle state. The data connection can be established by sending a radio resource control (RRC) connection request from the mobile device to a base station, which can be any one of a base transceiver station (BTS), evolved node B (eNodeB) or NodeB in the radio access network. The time consumed in establishing each data connection is compared to a threshold to detect a potential case of network congestion. The threshold, in one implementation, is a statistical measure derived from a dataset stored in a memory stack, wherein the dataset includes values of time consumed to establish data connection between the mobile device and the mobile network. In some instances, the threshold is adjustable by a parameter for conservative or aggressive detection of the potential case of network congestion.

In one implementation, the signal strength data (from block 504) is evaluated against a predefined range or a threshold to determine whether to promote the potential case of network congestion to a confirmed case of network congestion. In a further implementation, cell identifiers and location area codes associated with confirmed cases of network congestion are used to make a final decision on the confirmed cases of network congestion to anticipate network congestion.

In some embodiments, the mobile network uses any of Global System for Mobile Communications (GSM), Code Division Multiple Access (CDMA) or Long-Term Evolution (LTE) network communication technology. The local proxy 275 implementing the disclosed method anticipates the network congestion independent of other mobile devices on the mobile network. The local proxy 275 also anticipates network congestion without incurring signaling load on the mobile network.

Figure 6:
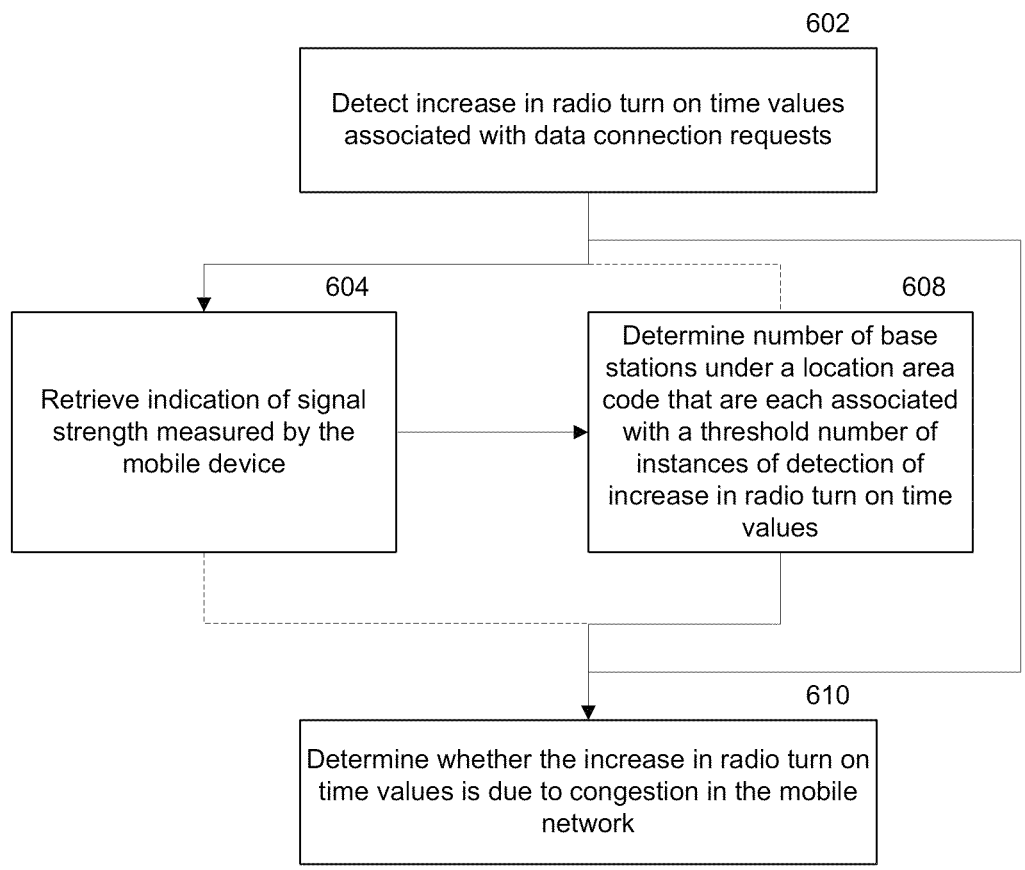
FIG. 6 illustrates a logic flow diagram of an example method for managing data traffic on a mobile device to reduce network signaling.

FIG. 6 illustrates a logic flow diagram of an example method for managing data traffic performed by local proxy 275 on a mobile device equipped with congestion recognition capability to reduce network signaling. At block 602, the local proxy 275 detects increase in radio turn on time values associated with data connection requests. The local proxy 275 retrieves an indication of signal strength measured by the mobile device at block 604, and determines a number of base stations under a location area code that are each associated with a threshold number of instances of detection of increase in radio turn on time values at block 608. The signal strength information may be used to reduce or eliminate effect of signal strength on the detected increase in radio turn on time values. Information relating to the base station and the location area code may be used to reduce or eliminate effect of geographic mobility of the mobile device on the detected increase in radio turn on time values.

At block 610, the local proxy 275 determines, based on information from blocks 604 and 608, whether the increase in radio turn on time values is due to congestion in the mobile network. Alternately, the local proxy 275 can determine whether the increase in radio turn on time values is due to congestion in the mobile network based on the indication of signal strength measured by the mobile device (block 604) or based on number of base stations under a location area code that are each associated with a threshold number of instances of detection of increase in radio turn on time values (block 608).

In one implementation, if the increase in radio turn on time values is due to congestion in the mobile network, the local proxy 275 manages data traffic on the mobile device by applying or triggering a blocking policy to reduce network signaling. The blocking policy can include rules to block data traffic having low priority and allow data traffic having high priority to the mobile network. The data traffic having high priority can be from active applications on the mobile device, while the data traffic having low priority can be from applications in background of the mobile device in some implementations. Alternately, if the increase in radio turn on time values is not caused by congestion in the mobile network, the local proxy 275 allows data traffic from the mobile device to signal the mobile network.

Figure 7:
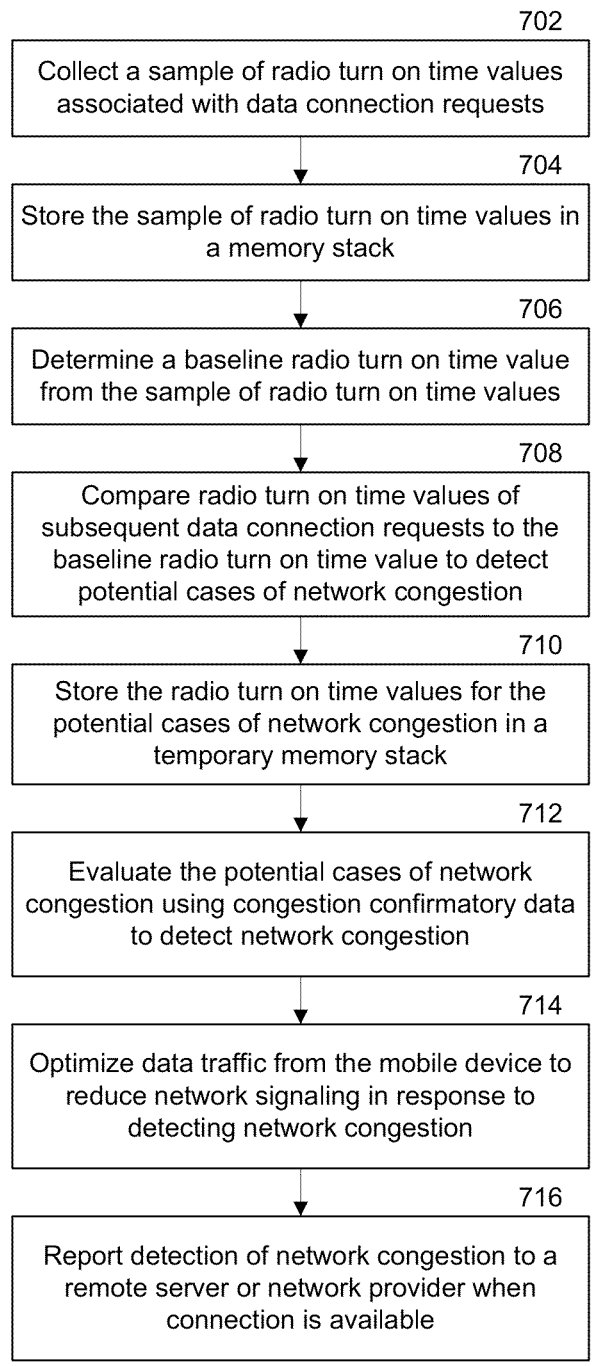
FIG. 7 illustrates a logic flow diagram of an example method for optimizing data traffic to reduce network signaling.

FIG. 7 illustrates a logic flow diagram of an example method for optimizing data traffic to reduce network signaling. The example method can be performed by one or more components of the local proxy 275.

At block 702, the local proxy 275 collects a sample of radio turn on time values associated with data connection requests. In one implementation, the local proxy 275 can determine radio turn on time value as the difference between the time of a data request from an application on the mobile device to transition of the radio state to a connected state from the idle state. At block 704, the local proxy 275 stores the sample of radio turn on time values in a memory stack. The memory stack can be a logical memory on the mobile device, for example. At block 706, the local proxy 275 determines a baseline radio turn on time value from the sample of radio turn on time values. Further at block 708, the local proxy 275 compares radio turn on time values of subsequent data connection requests to the baseline radio turn on time value to detect potential cases of network congestion. Next at block 710, the radio turn on time values for the potential cases of network congestion is then stored in a temporary memory stack locally on the mobile device.

At block 712, the local proxy 275 evaluates the potential cases of network congestion using congestion confirmatory data to detect network congestion. In one implementation, the evaluation can include promoting the potential cases of network congestion to confirmed cases of network congestion based on indications of signal quality associated with the potential cases of network congestion. In a further or alternate implementation, the evaluation can also include promoting the potential cases of network congestion to confirmed cases of network congestion based on a rejection message received from the network in response to one of the subsequent data connection requests. In a further implementation, the evaluation can include taking a final decision on the confirmed cases of network congestion based number of the confirmed cases of network congestion per base station in the same location area code.

At block 714, the local proxy 275 optimizes data traffic from the mobile device to reduce network signaling in response to detecting network congestion. At block 716, the local proxy 275 reports the detection of network congestion to a remote server or network provider when a connection is available.

FIG. 8 illustrates examples of data sampled and analyzed by the congestion detector/recognizer 164 in detecting and verifying congestion in the mobile network. Table 802 depicts an example initial setup time stack that stores n number of setup time samples, from where a baseline is calculated. Table 804 depicts an example temporary stack that stores setup time values that are higher than the baseline. Table 806 depicts potential congestion cases from the temporary stack 804 that have increased setup time values. The potential congestion cases have cell ID, location area code, signal strength, and/or the like along with setup time values. Based at least on the signal strength data, some of the potential congestion cases (e.g., 808) are promoted to confirmed congestion cases, which are tabulated on table 810. The confirmed congestion cases are evaluated based on number of confirmed congestion cases per cell ID in the same location area code to determine whether to take a final decision on congestion, and enforce a blocking policy on the mobile device to manage congestion at the mobile network.

Figure 10:
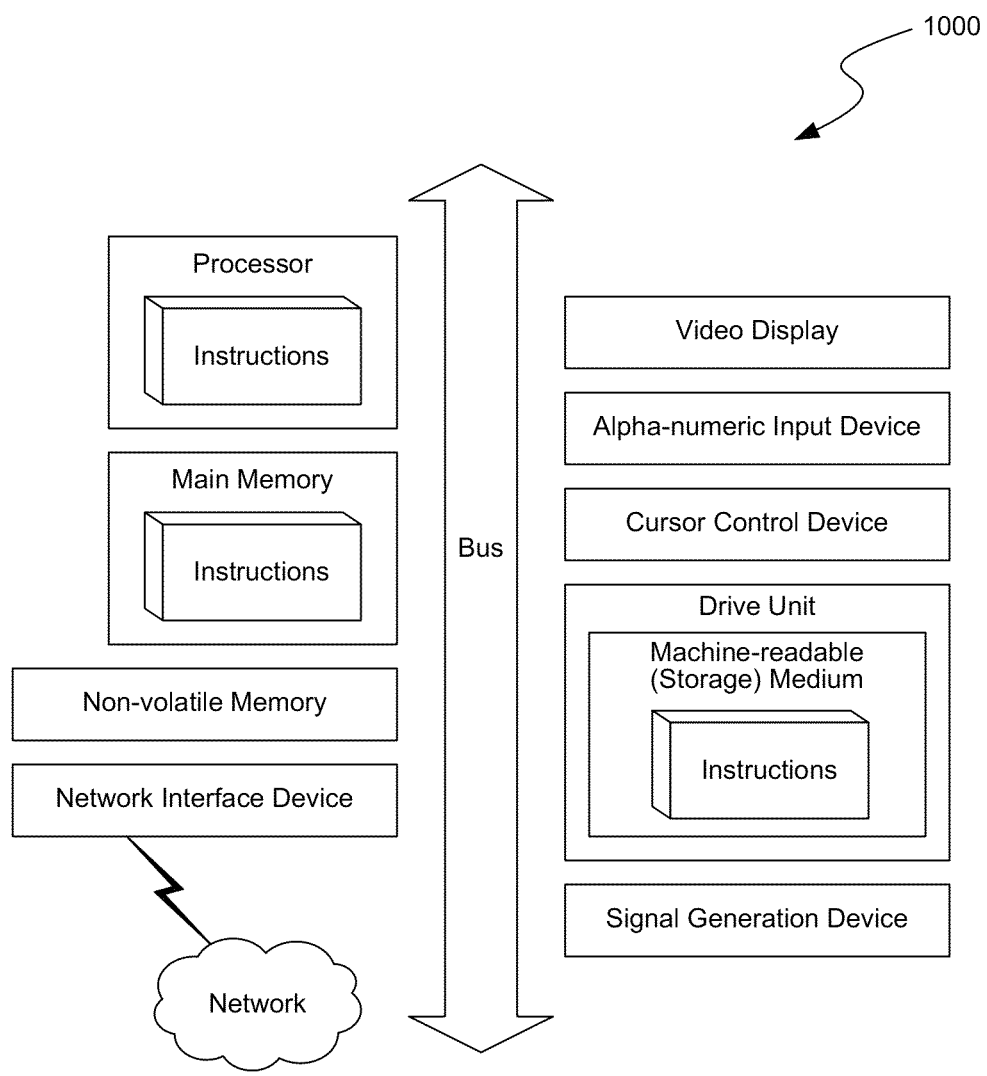
FIG. 10 shows a diagrammatic representation of a machine in the example form of a computer system within which a set of instructions, for causing the machine to perform any one or more of the methodologies discussed herein, may be executed.

FIG. 10 shows a diagrammatic representation of a machine in the example form of a computer system within which a set of instructions, for causing the machine to perform any one or more of the methodologies discussed herein, may be executed.

In the example of FIG. 10, the computer system 1000 includes a processor, main memory, non-volatile memory, and an interface device. Various common components (e.g., cache memory) are omitted for illustrative simplicity. The computer system 1000 is intended to illustrate a hardware device on which any of the components depicted in the example of FIGS. 2A-2D (and any other components described in this specification) can be implemented. The computer system 1000 can be of any applicable known or convenient type. The components of the computer system 1000 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶13, other aspects may likewise be embodied as a means-plus-function claim, or in other forms, such as being embodied in a computer-readable medium. (Any claims intended to be treated under 35 U.S.C. §112, ¶13 will begin with the words "means for.") Accordingly, the applicant reserves the right to add additional claims after filing the application to pursue such additional claim forms for other aspects of the disclosure.

The invention claimed is:

1. A method implemented by a mobile device for congestion detection in a mobile network, the method, comprising:
sampling, at a mobile device, setup times for establishing a data connection between the mobile device and one or more base stations in the mobile network;
analyzing at least the sampled setup times and thereby detecting congestion at a base station from the one or more base stations in the mobile network; and
applying a blocking policy on traffic from the mobile device in response to detecting congestion at the base station,
wherein the analyzing comprises using a baseline determined from the sampled setup times to detect an increase in setup times associated with subsequent data connections established between the mobile device and the one or more base stations.

2. The method of claim 1, wherein, a setup time is measured as a difference between a timestamp associated with a data request at the mobile device and a timestamp associated with a transition of a radio state of the mobile device from an idle state to a connected or high state.

3. The method of claim 1, a setup time includes a radio access bearer reconfiguration time.

4. The method of claim 1, wherein, the mobile device includes a smartphone or a superphone, a tablet or a phablet.

5. The method of claim 1, further comprising:
storing a set of the setup times in a memory stack, wherein the analyzing is triggered when the memory stack is full.

6. The method of claim 1, wherein, the increase in setup times is used as an indicator by the mobile device to detect congestion at the base station.

7. The method of claim 6, wherein the baseline is calculated as a sum of a mean of a set of the setup times, a standard deviation of the set of the setup times and a sensitivity factor.

8. The method of claim 7, wherein the sensitivity factor adjusts sensitivity in detecting the increase in setup times.

9. The method of claim 1, further comprising:
detecting that the base station in the mobile network is congested based on a rejection message received in response to attempts to establish a data connection.

10. The method of claim 1, further comprising:
determining an amount of time to wait before attempting to connect or reconnect to the mobile network.

11. The method of claim 1, wherein the blocking policy allows high priority traffic from the mobile device to reach the base station in the mobile network.

12. The method of claim 1, further comprising:
logging information on the detected congestion; and
periodically uploading the logged information to a remote server.

13. The method of claim 12, wherein the logged data is processed to generate a congestion report.

14. The method of claim 13, wherein the congestion report is provided to an operator or service provider of the mobile network.

15. The method of claim 1, wherein the base station is a Base Transceiver Station (BTS) in a Global System for Mobile Communications (GSM) or Code Division Multiple Access (CDMA) mobile network.

16. The method of claim 1, wherein, the base station is a Node B in a 3G mobile network or an Evolved Node B in Long-Term Evolution (LTE) network.

17. A non-transitory machine readable storage medium having stored thereon instructions which when executed by a machine, causes the machine to:
aggregate setup times for connection requests in a mobile network to determine a baseline;
detect increase in setup times for subsequent connection requests in the mobile network from the baseline;
determine that a base station in the mobile network is congested based at least in part on the detected increase in setup times; and
apply a blocking policy to selectively block traffic from the mobile device from reaching the mobile network in response to determining that the base station in the mobile network is congested.

18. The medium of claim 17, wherein the machine uses reception quality associated with the subsequent connection requests to confirm that the base station in the mobile network is congested.

19. The medium of claim 18, wherein the machine further uses a distribution pattern of the subsequent connection requests to further confirm that the base station in the mobile network is congested.

20. The medium of claim 17, wherein the machine determines an amount of time to wait before attempting to connect or reconnect to the mobile network.

21. The medium of claim 17, wherein the blocking policy is applied for a predefined duration of time, or until a high priority data request is detected at the mobile device.

22. The medium of claim 19, wherein the distribution pattern of the subsequent connection requests is established using location area code and base station identifier information associated with the subsequent connection requests.

23. The medium of claim 17, wherein when a rejection message is received in response to any one of the subsequent connection requests, the machine determines that the base station in the mobile network is congested, and applies the blocking policy on traffic from the machine to reduce signaling to the mobile network.

24. The medium of claim 17, wherein the baseline is a statistical measure that adapts to network peculiarities.

25. A method for anticipating network congestion, comprising:
sampling time consumed to establish a data connection between a mobile device and a mobile network;
collecting data including at least one of signal strength data, cell identifier, and location area code associated with the data connection between the mobile device and the mobile network;
anticipating, based at least on the time consumed and the collected data, network congestion; and
blocking traffic from the mobile device to the mobile network in response to the anticipating network congestion.

26. The method of claim 25, further comprising:
determining an amount of time to wait before attempting to connect or reconnect the mobile device to the mobile network.

27. The method of claim 25, further comprising:
querying a modem of the mobile device to determine whether a data connection rejection message is received from the mobile network.

28. The method of claim 27, further comprising:
anticipating network congestion on the mobile network regardless of the time consumed or the collected data when the data connection rejection message is received from the mobile network.

29. The method of claim 28, wherein the time consumed to establish the data connection is based on the time difference between time of a data request and time of transition of the radio state to connected state from idle state.

30. The method of claim 28, wherein the time consumed in establishing each data connection is compared to a threshold to detect a potential case of network congestion.

31. The method of claim 28, wherein the time consumed to establish the data connection is based on time to complete a radio bearer reconfiguration procedure.

32. The method of claim 30, wherein the threshold is a statistical measure derived from a dataset stored in a memory stack, wherein the dataset includes values of time consumed to establish data connection between the mobile device and the mobile network.

33. The method of claim 32, wherein the threshold is adjustable by a parameter for conservative or aggressive detection of the potential case of network congestion.

34. The method of claim 25, wherein the signal strength data is evaluated against a predefined range or a threshold to determine whether to promote the potential case of network congestion to a confirmed case of network congestion.

35. The method of claim 34, wherein cell identifiers and location area codes associated with confirmed cases of network congestion are used to make a final decision on the confirmed cases of network congestion to anticipate network congestion.

36. The method of claim 25, wherein the traffic from the mobile device that is blocked from accessing the network includes low priority traffic.

37. The method of claim 36, wherein the low priority traffic includes requests from background processes on the mobile device.

38. The method of claim 36, wherein high priority traffic from the mobile device is allowed to signal the mobile network.

39. The method of claim 38, wherein the high priority traffic includes a phone call, an SMS, an MMS, an email, or other user initiated request.

40. The method of claim 25, wherein the mobile network uses any of Global System for Mobile Communications (GSM), Code Division Multiple Access (CDMA) or Long-Term Evolution (LTE) network communication technology.

41. The method of claim 25, further comprising:
generating a congestion report using at least some of the collected data; and
periodically uploading the congestion report to a server cloud.

42. The method of claim 41, wherein information in the congestion report and other congestion reports from multiple mobile devices associated with the mobile network is aggregated and provided to an operator of the mobile network.

43. The method of claim 42, wherein the information in the congestion report provides near real time information on network congestion.

44. The method of claim 42, wherein the information in the congestion report provides packet call quality information relating to the mobile network.

45. The method of claim 25, wherein the network congestion is anticipated by the mobile device independent of other mobile devices on the mobile network.

46. The method of claim 25, wherein the network congestion is anticipated by the mobile device without incurring signaling load on the mobile network.

47. The method of claim 25, wherein establishing the data connection includes sending a radio resource control (RRC) connection request by the mobile device to a base station.

48. The method of claim 25, wherein the base station is one of a base transceiver station (BTS), evolved node B (eNodeB) or NodeB.

49. A mobile device equipped for managing data traffic to reduce network signaling, comprising:
a radio configured to send data connection requests to a mobile network;
a processor;
a memory unit having instructions stored thereon which when executed by the processor, causes the processor to:
detect increase in radio turn on time values associated with data connection requests;
determine whether the increase in radio turn on time values is due to congestion in the mobile network; and
on determining that the increase in radio turn on time values is due to congestion in the mobile network, manage outgoing data traffic on the mobile device by applying a blocking policy,
wherein the radio turn on time is measured as the difference between time of a data request from an application on the mobile device and time of radio state transition from an idle state to a connected state.

50. The mobile device of claim 49, wherein the increase is detected from comparison to a reference radio turn on time value.

51. The mobile device of claim 49, wherein on determining that the increase in radio turn on time values is due to congestion in the mobile network, the processor is caused to determine an amount of time to wait before attempting to connect or reconnect to the mobile network.

52. The mobile device of claim 49, wherein the blocking policy includes rules to block data traffic having low priority and allow data traffic having high priority to the mobile network.

53. The mobile device of claim 52, wherein the data traffic having high priority are from active applications on the mobile device, while the data traffic having low priority are from applications in background of the mobile device.

54. The mobile device of claim 49, wherein if the increase in radio turn on time values is not caused by congestion in the mobile network, the processor is further caused to allow outgoing data traffic from the mobile device to the mobile network.

55. The mobile device of claim 49, wherein signal strength information is used to reduce or eliminate effect of signal strength on the detected increase in radio turn on time values.

56. The mobile device of claim 49, wherein information relating to the base station and the location area code is used to reduce or eliminate effect of geographic mobility of the mobile device on the detected increase in radio turn on time values.

57. The mobile device of claim 50 wherein the reference radio turn on time value is based on radio turn on time values of a sample number of data connection requests.

58. The mobile device of claim 49, wherein the data connection requests are sent from the mobile device to one or more base stations in the mobile network.

59. A system for optimizing data traffic to reduce network signaling, comprising:
means for collecting a sample of radio turn on time values associated with data connection requests;
means for determining a baseline radio turn on time value from the sample of radio turn on time values;
means for comparing radio turn on time values of subsequent data connection requests to the baseline radio turn on time value to detect potential cases of network congestion;

means for evaluating the potential cases of network congestion using congestion confirmatory data and thereby detecting network congestion; and means for optimizing data traffic from the mobile device to reduce network signaling in response to detecting network congestion.

60. The system of claim 59, wherein the means for evaluating further comprises:

means for promoting the potential cases of network congestion to confirmed cases of network congestion based on indications of signal quality associated with the potential cases of network congestion.

61. The system of claim 60, wherein the means for evaluating further comprises:

means for promoting the potential cases of network congestion to confirmed cases of network congestion based on a rejection message received from the network in response to one of the subsequent data connection requests.

62. The system of claim 59, wherein the means for evaluating further comprises:

means for taking a final decision on the confirmed cases of network congestion based number of the confirmed cases of network congestion per base station in the same location area code.

63. The system of claim 59, further comprising:

means for storing the sample of radio turn on time values associated with the data connection requests;

means for storing radio turn on time values associated the potential cases of network congestion.

64. The system of claim 59, further comprising:

means for determining radio turn on time value as the difference between time of a data request from an application on the mobile device to transition of the radio state from an idle state to a connected state.

65. The system of claim 59, further comprising:

means for determining radio turn on time value as time to complete a radio bearer reconfiguration procedure.

66. The system of claim 59, wherein the means for optimizing data traffic includes means for selectively blocking traffic from the mobile device based on status of applications from where the traffic originate.

67. The system of claim 66, wherein the traffic originating from applications that are running in the background are subject to blocking.

68. The system of claim 59, wherein the means for optimizing data traffic includes means for selectively blocking traffic from applications that are associated with high volume of transactions.

69. The system of claim 59, further comprising:

means for querying a mobile device component to detect rejection of an attempt to establish a data connection with a mobile base station.

70. The system of claim 69, further comprising:

means for selectively blocking traffic from the mobile device from traversing the mobile network to reduce signaling overload on the mobile network in response to detecting the rejection.

* * * * *